US011694030B1

(12) United States Patent
Imani et al.

(10) Patent No.: US 11,694,030 B1
(45) Date of Patent: Jul. 4, 2023

(54) SYSTEM AND METHOD FOR AUTOMATIC THEMING OF A PLURALITY OF THOUGHT OBJECTS

(71) Applicant: Fulcrum Management Solutions Ltd., Rossland (CA)

(72) Inventors: Farhad Imani, Vancouver (CA); Thomas John Procter, Gibsons (CA)

(73) Assignee: Fulcrum Management Solutions Ltd., Rossland (CA)

( * ) Notice: Subject to any disclaimer, the term of this patent is extended or adjusted under 35 U.S.C. 154(b) by 0 days.

(21) Appl. No.: 17/714,317

(22) Filed: Apr. 6, 2022

(51) Int. Cl.
G06F 40/30 (2020.01)
G06F 40/284 (2020.01)
G06F 40/117 (2020.01)
G06F 40/242 (2020.01)

(52) U.S. Cl.
CPC .......... *G06F 40/284* (2020.01); *G06F 40/117* (2020.01); *G06F 40/242* (2020.01)

(58) Field of Classification Search
CPC .............................. G06F 40/30; G06F 40/284
See application file for complete search history.

(56) References Cited

U.S. PATENT DOCUMENTS

| 10,460,242 | B1* | 10/2019 | Procter | G06N 5/02 |
| 2006/0143175 | A1* | 6/2006 | Ukrainczyk | G06F 40/117 |
| | | | | 707/E17.084 |
| 2014/0101119 | A1* | 4/2014 | Li | G06F 16/3331 |
| | | | | 707/706 |
| 2017/0116178 | A1* | 4/2017 | Kumar Rangarajan Sridhar | ........ |
| | | | | H04W 4/14 |
| 2020/0167378 | A1* | 5/2020 | Procter | G06F 16/3344 |

OTHER PUBLICATIONS

"Thought Exchange—How it works", [online] http://www.thoughtexchange.com, retrieved from www.archive.org, archived on Jun. 2021. (Year: 2021).*

* cited by examiner

*Primary Examiner* — Jialong He
(74) *Attorney, Agent, or Firm* — Gustavo Marin; Marin Patents LLC

(57) ABSTRACT

A system and method for automated theming of thought objects is disclosed. In a preferred embodiment, an object theming computer creates aggregated text by aggregating text associated with a first thought object, the aggregated text comprising descriptive and important text associated with the first thought object. The object theming computer then tokenizes the aggregated text into tokens. Further, a theme is associated to thought objects using one or more previously themed thought objects. If one or more thought objects have no associated theme, then a theme is generated and associated to the un-themed thought objects using a current plurality of the one or more thought objects.

14 Claims, 18 Drawing Sheets

SYSTEM AND METHOD FOR AUTOMATIC THEMING OF A PLURALITY OF THOUGHT OBJECTS

BACKGROUND OF THE INVENTION

Field of the Art

The disclosure relates to the field of processing qualitative responses from a plurality of user devices, and more particularly to the field of computing and categorizing thought objects into themes based on a plurality of qualitative responses received from a plurality of user devices.

Discussion of the State of the Art

In systems where input from a plurality of user devices is solicited, understanding an effective distribution mechanism of thought objects for solicitation of responses by a plurality of user devices is challenging.

Typically, when results from a plurality of user participant devices are used to gather input on a subject, two different types of participant responses are elicited: quantitative responses and qualitative responses. A quantitative response is a close-ended response, such as a multiple choice, numeric style, or yes/no response. A qualitative response is an open-ended, comment style response, where the participant has freedom to textualize associated ideas and is not constrained by pre-determined answers. Accordingly, eliciting qualitative responses may have substantial benefits over quantitative responses in that qualitative responses can provide more detailed information on participant interests, consisting of areas of alignment, sentiment or topics, to name a few.

However, there are well known limitations with handling, evaluating, distributing, and theming qualitative responses, as compared to quantitative responses. Theming thought objects can be defined as application of a text label to a thought object. That is, theming may include processing thought objects (e.g., text in a review or an email exchange) to mark them with labels in order to categorize them into specific classes. Theming in thought object exchange platforms, (that is, one or more communication environments where thought objects may be exchanged, such as text messaging, email, instant messaging (IM), conference meeting tools, etc.), is very important and challenging. Systems known in the art cannot provide exchange-specific detailed theming of thought objects based on the qualitative content of thought objects within an exchange. Moreover, applying previously manually themed thought objects to build a supervised model extendable to new exchanges is very challenging because: (1) Manual Theming in each exchange is done based on the requirements of the theming in that specific exchange and might not be transferred to all other exchanges; and (2) Size of training data is not sufficient to generate a comprehensive model of theming.

Further, conventional supervised NLP approaches require a significant number of training samples, these methods are not effective since widespread topics covered in exchanges that do not overlap, lead to a limited number of training samples per topic. In some embodiments, where there may be some overlaps across exchanges, different tenants are inclined to theme thought objects differently, and general themes provided, in systems known in the art, are not usable in a thought object exchange, since tenants are interested in providing very specific themes per group of thought objects.

Accordingly, a need in the art exists for a system and method that automatically learns from a limited number of thought objects from one or more exchanges that correlate well with that exchange in a supervised framework. Further, thought objects that are not themed using this solution are sent to be themed in a completely automatic unsupervised framework using data in that specific exchange.

SUMMARY OF THE INVENTION

Accordingly, the inventor has conceived and reduced to practice, in a preferred embodiment of the invention, a system and method to automatically learn from a limited number of themed thought objects from one or more exchanges that correlate well with that exchange, in a supervised framework to theme thought objects, and for thought objects that are not themed a completely automatic unsupervised framework using data in that specific exchange is used to theme un-themed thought objects.

According to a preferred embodiment of the invention, an automated approach to theming thought objects using a limited number of themed thought objects is disclosed. A novel solution to represent themed thought objects with a weighted combination of a few limited important stems comprise unsupervised methods comprising an automated, custom combination of text-analysis techniques to group a plurality of thought objects into the preferred number of clusters (themes). Further, in an embodiment the novel solution described herein comprises methods and systems to automatically learn from a limited number of thought objects from one or more exchanges that correlate well with that exchange in a supervised framework.

Further, a preferred number of stable topics may be determined based on the themed thought objects, followed by the determination of a preferred number of separated clusters associated to selected stable topics. In an embodiment, stable topics may be generated such that detection of topics with different initial random states may be such that the stem distribution of topics does not change substantially. In a preferred embodiment, each group comprising a plurality of thought objects may be associated with a group label, defining a theme for that group. The group label may be generated based on text comprised within the plurality of thought objects grouped in that group and upon the occurrence of stemmed keywords within the grouped plurality of thought objects. Further, naming a cluster using a most frequent order of the stems of selected tags within at least a portion of thought objects in an associated cluster. Converting stem terms into their most-frequently used forms specific to an exchange provides an improvement over systems in the art that use lemmas that are not tailored to the exchange.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
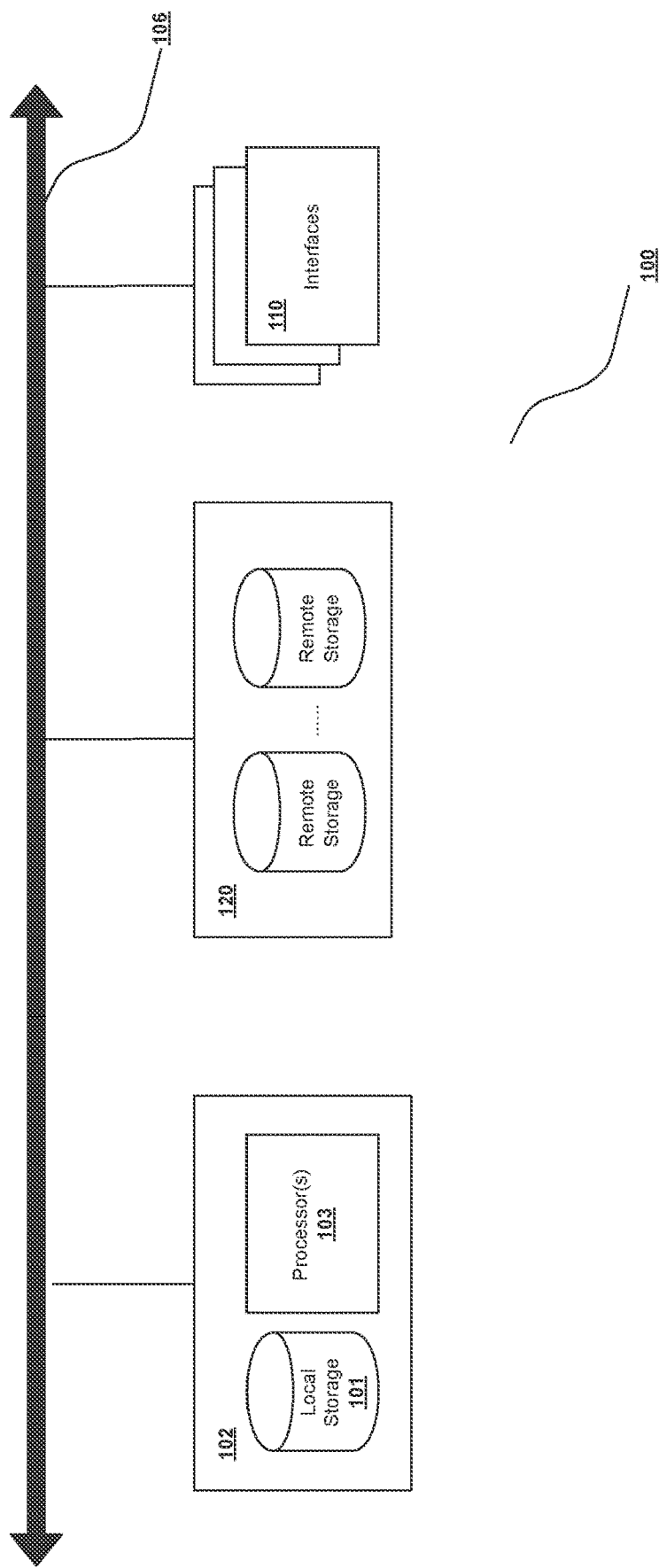
FIG. 1 is a block diagram illustrating an exemplary hardware architecture of a computing device used in an embodiment of the invention.

The inventor has conceived, and reduced to practice, a system and method to automatically learn from a limited number of themed thought objects form one or more exchanges that correlate well with that exchange in a supervised framework and for thought objects that are not themed, a completely automatic unsupervised framework is disclosed that may use data in a specific exchange to theme un-themed thought objects.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
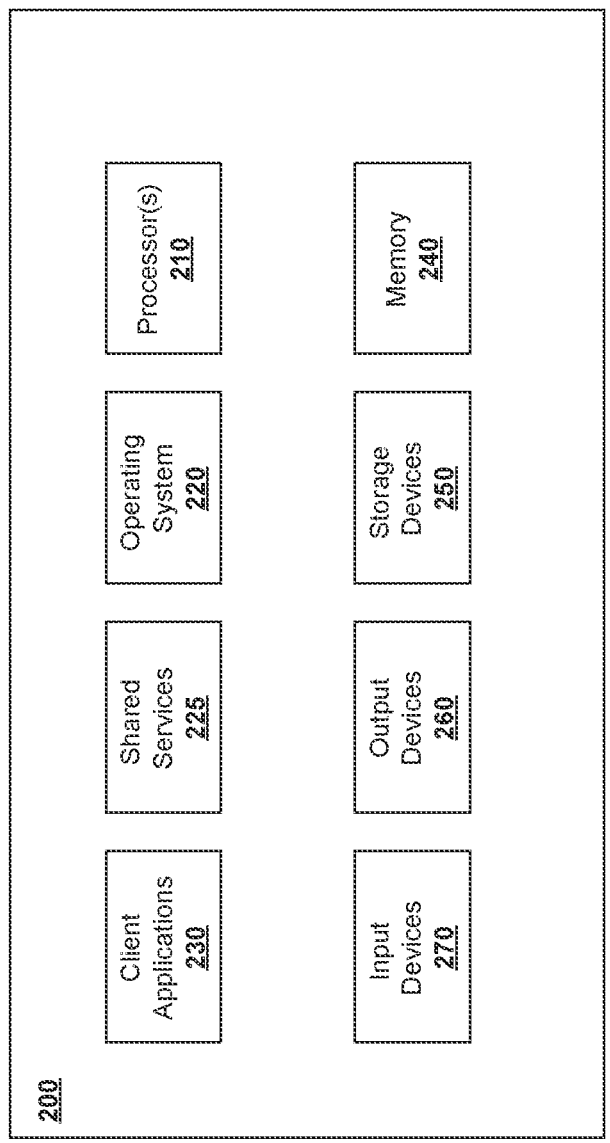
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
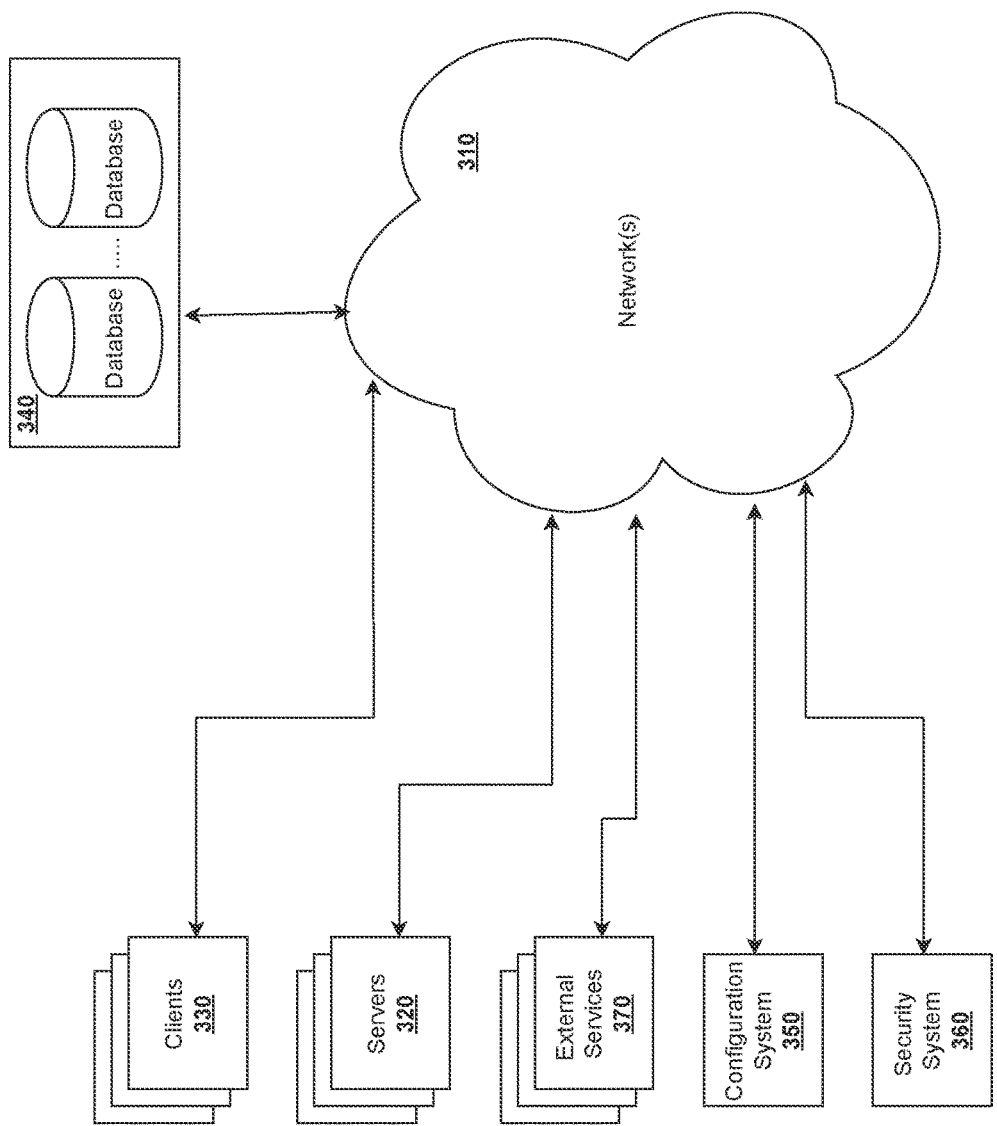
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premise.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
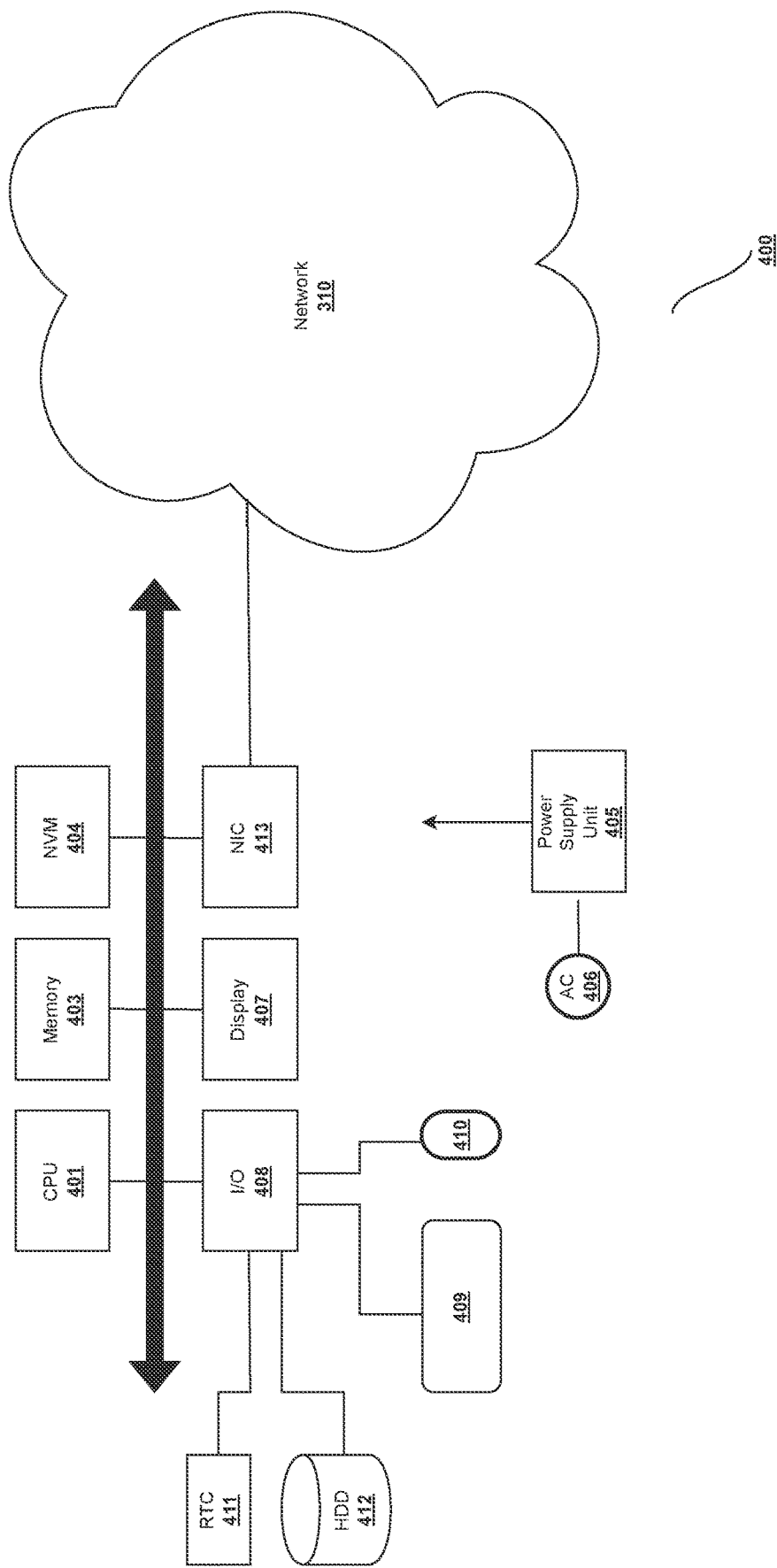
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
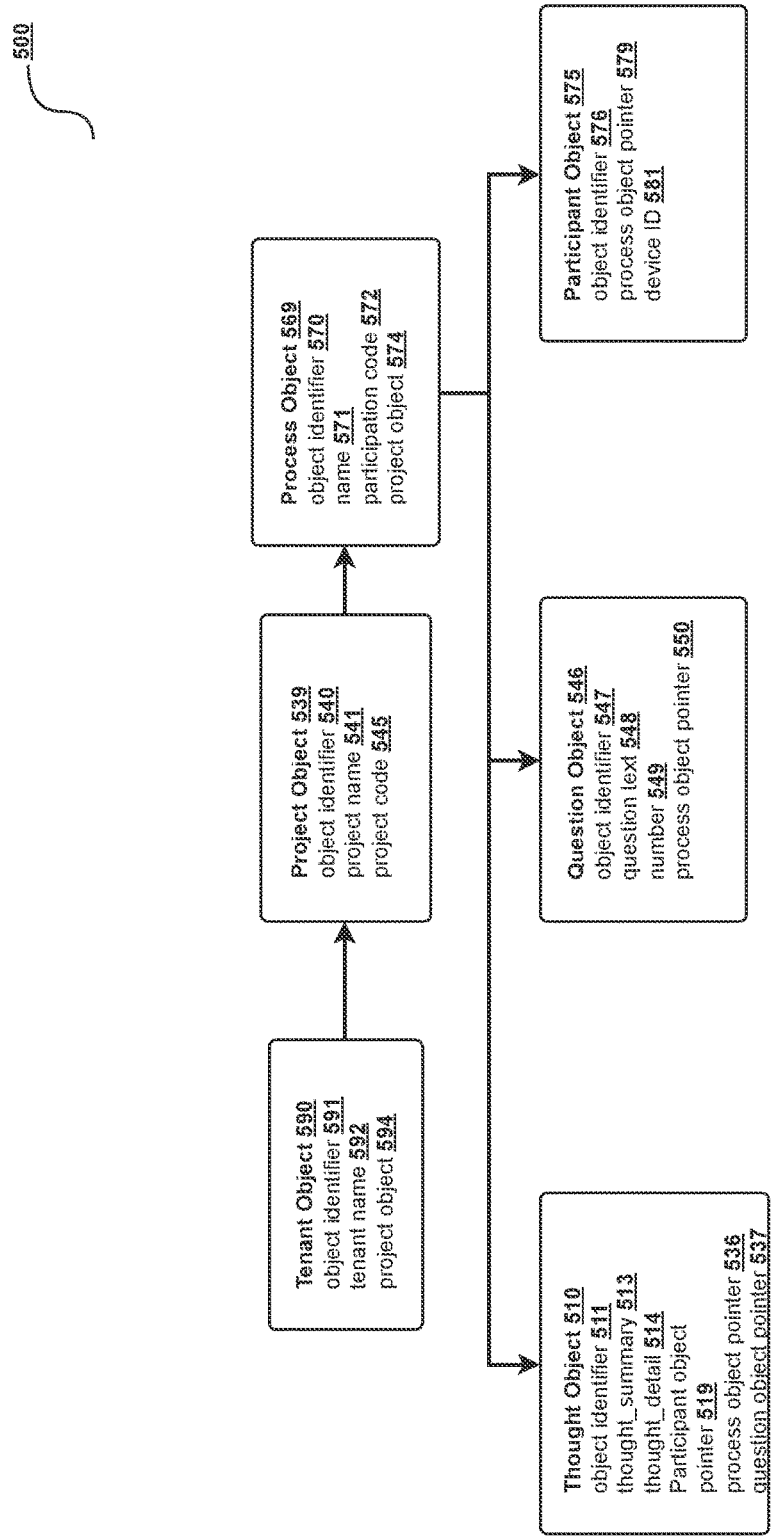
FIG. 5 is a block diagram illustrating a plurality of objects used for thought object theming, according to a preferred embodiment of the invention.

FIG. 5 is a block diagram illustrating a plurality of objects used for thought object theming, according to a preferred embodiment of the invention. According to the embodiment, a plurality of programming instructions stored in memory 240 that when executed by at least one processor 210 comprise a plurality of objects that may comprise data, in the form of fields, often known as attributes and programming instructions, in the form of procedures, often known as methods. Objects 500 may be arranged such that procedures can access and often modify one or more data fields of an associated object. In various embodiments, programming instructions enable objects to interact with one another. In a preferred embodiment, objects 500 may be implemented in an object-relational database management system, for example, PostgreSQL and the like.

Accordingly, it can be appreciated that an understanding of a plurality of thought objects received from a plurality of participant devices 611 (refer to FIG. 6) provides a means for large scale involvement of users via devices 610 in a networked environment to participate in a quantitative fashion to evaluate thought objects that require an understanding of interest regardless of device location, temporal displacement (i.e. when the respondents responded), psychology (willingness to provide responses in an open forum, or requirement for anonymity), and the like. An interest categorization may represent a collective understanding of what may be most important to at least a portion of a group of users associated to devices 610, for example, across dispersed groups such that understanding of concepts from a plurality of user devices 611 by a plurality of users.

Tenant object 590 may be a plurality of programming instructions stored in memory 240 that when executed by one or more processors 210 describe a tenant of system 600 (referring to FIG. 6), that is, a configured entity that may execute a plurality of projects described by one or more associated project objects 539 for analysis of one or more thought objects 510 received from a plurality of participant devices 611. Accordingly, one or more project objects 539, that are associated to the tenant object 590, are connected by project object pointer 594. In a preferred embodiment, tenant object 590 may comprise: an object identifier 591 whereby each instantiation of tenant object 590 may be referred to uniquely within the system 600; tenant name 592 may be a text description of the instant tenant object 501; project object pointer 594 (described above) comprises one or more pointers to one or more project objects 539. Said differently, system 600 may configure multiple tenant objects 590 whereby each tenant object 590 may be associated to a plurality of project objects 539 whereby each associated project object 539 is associated to a plurality of other objects to enable analysis of qualitative patterns for a plurality of priority values received from a plurality of participant devices 611. It should be appreciated that participant devices 611 may be at least a portion of devices 610. In a preferred embodiment, participant devices 611 may be devices that, through network 310, provided responses to, for example, a question object 546 and/or thought objects 510. In some embodiments, facilitator devices 612 (referring to FIG. 6) may be considered participant devices 610.

Project object 539 may be a plurality of programming instructions stored in memory 240 that when executed by processors 210 describe a project for an analysis of one or more thought objects 510 received from a plurality of participant devices 611, whereby a project may be a planned collaborative execution of the methods described herein utilizing one or more specially programmed components 600. Project object 539 may comprise: object identifier 540 which may be a globally unambiguous persistent identifier representing an instance of project object 539; project name 541 may be textual description of the instance of the project object 539; project code 545 may be unique identifier associated to a project object 539. Thought object 510 may be a plurality of programming instructions stored in memory 240 that when executed by processors 210 comprise an arrangement of information in the form of ideas received from device 610. Thought object 510 may comprise: object identifier 511 which may be a globally unambiguous persistent identifier representing an instance of thought object 510; thought_summary 513 may be an arrangement of information corresponding to a qualitative response from a device 610 to another arrangement of information in the form of an open-ended question from, for example, a question object 546; thought_detail 514 may be an additional arrangement of information corresponding to an additional qualitative response from a device 610, for example, an explanation of the importance of the qualitative response represented by thought_summary 513; participant object pointer 519 is a pointer to a participant object 575 who shared the instant thought object 510; process object pointer 536 may be a pointer to an associated process object 569; question object pointer 537 may be a pointer to an associated question object 546 to, for example, have access to the question object 546 through its memory address instead of a new object being created on a stack.

Question object 546 may be a plurality of programming instructions stored in memory 240 that when executed by processors 210 comprise details around the associated arrangement of information associated to a corresponding an open-ended question by, for example, as configured by a facilitator device 612 (also referred to herein as leader device 612), the arrangement of information being a point of origination for which a plurality of thought objects 510 result, are distributed by project controller 602, and for which a plurality of priority value responses are solicited from at least a portion of devices 610 to perform an analysis of qualitative patterns. Question object 546 may comprise, at least: object identifier 547 which may be a globally unambiguous persistent identifier representing an instance of question object 546; question text 548 may be an arrangement of information comprising textual description in the form of an open-ended question; number 549 may be an additional unique identifier for the instant question object 546 that may indicate an index of the instant question in a sequence or series of related question objects in a project object 539; process object pointer 550 may be a pointer to an associated process object 569, for example, to have access to the process object 569 through its memory address instead of a new object being created on a stack.

Process object 569 may be a plurality of programming instructions stored in memory 240 that when executed by processors 210 comprise an object describing a process corresponding to a project object 569 for an analysis of qualitative patterns. A process may provide a procedure for how a project is to be executed, for example, how thought objects 510 will be distributed, how responses are received and processed, and the like. Process object 569 may comprise: object identifier 570 which may be a globally unambiguous persistent identifier representing an instance of process object 569; name 571 may be textual description of the instance of the process object 569; participation code 572 may be an additional unique identifier associated to the instant process object 569; project object pointer 574 may be a pointer to a corresponding project object 539 to, for example, have access to the project object 539 through its memory address instead of a new object being created on a stack.

Participant object 575 may be a plurality of programming instructions stored in memory 240 that when executed by processors 210 comprises an object to describe a participant associated to a participant device 611 (that is, each participant object corresponds to a corresponding device 611). In some embodiments, participant objects 575 may be assigned to devices 610 that have participated (provided one or more thought objects 510 in response to a question object 546). Participant object 575 may comprise, at least: object identifier 576 which may be a globally unambiguous persistent identifier representing an instance of participant object 575; process object pointer 579 may be a pointer to an associated process object 569 to, for example, have access to the process object 569 through its memory address instead of a new object being created on a stack; project object pointer 579 may be a pointer to a project object 539 to, for example, have access to the project object 539 through its memory address instead of a new object being created on a stack; device ID 581 identifies an associated device 560. It should be noted that, in a preferred embodiment, a tenant object 590 may represent properties and methods corresponding to a user, or group of users, of the system (for example, a company, organization, or the like). Each tenant object 590 may be associated to one or more project object 539 that may provide details around a project for exchanging information following one or more processes associated to one or more process objects 569 whereby at least one question object 546 and a plurality of thought objects 510 describe an interaction by devices 610 (at least a portion of which are associated to participant objects 611).

Figure 6:
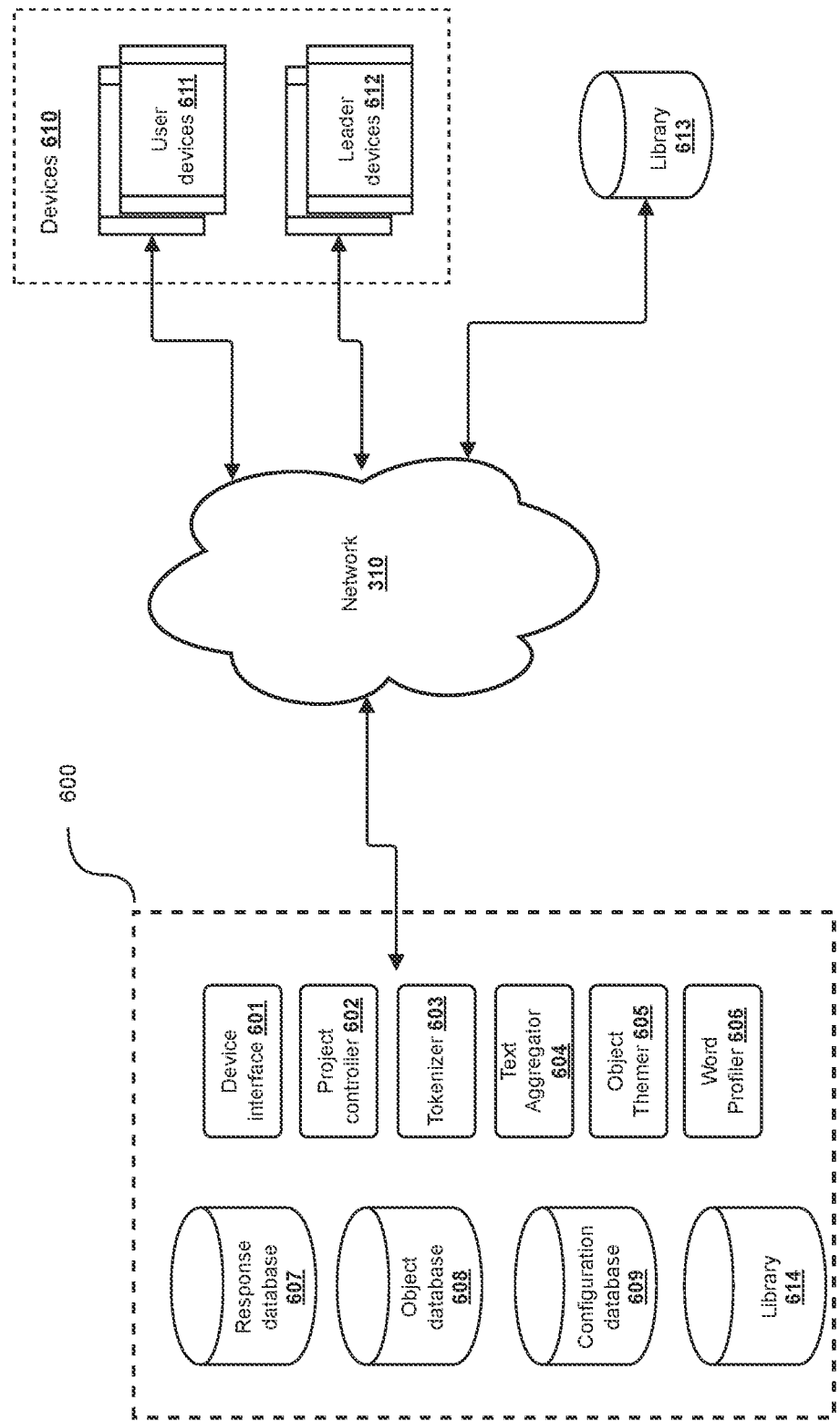
FIG. 6 is a block diagram illustrating an exemplary conceptual architecture of a thought object theming communication environment, according to a preferred embodiment of the invention.

FIG. 6 is a block diagram illustrating an exemplary conceptual architecture of an object theming communication environment, according to a preferred embodiment of the invention. According to the embodiment, object theming communication environment may comprise object theming computer 600 comprising a plurality of components each comprising at least a plurality of programming instructions, the programming instructions stored in memory 240 that when executed by one or more processors 210, cause one or more processor 210 to perform operations disclosed herein. In a preferred embodiment, a question object 546 is received at a project controller 602 from a first leader device 612. The question object 546 may then be distributed, by the project controller 602 to at least a portion of a plurality of devices 611, subsequently, a plurality of thought objects 510 may be received from at least a portion of the at least portion of the plurality of devices 610. It should be appreciated that questions objects 546 when received from a leader device 612, the objects and associated parameters may be stored in object database 608 or in some other data storage location. Similarly, thought objects 510 received from the at least portion of the at least portion of the plurality of devices 610 may be stored in object database 608. In some embodiments, project controller 602 may process methods disclosed herein based at least in part on configuration within project object 539 and process object 569.

It should be appreciated that question object 546 and at least a portion of the plurality of thought objects 510 (and other associated objects) may be associated to at least one project object 539. In a preferred embodiment, a tenant object 590 may have one or more associated project objects 539, that is, that a tenant may perform a plurality of mutually exclusive projects (also referred to herein as an exchange) to understand the dynamics and behaviors of a plurality of users via data received from a plurality of devices 610. Though in a preferred embodiment, projects are self-contained in nature (in terms of analyses that may be performed), it should be appreciated that in some embodiments, projects may be interrelated, and calculations by system 600, may be performed across a plurality of projects.

According to some embodiments, each thought object 510 must meet certain criteria in order to qualify for inclusion into a filter and select computation, wherein such qualification may at least include a determination, by project controller 602, whether after removal of stop words and punctuations from a given thought object 510, any token (as described below) remains for further analysis. If no such token remains for analysis, such thought object 510 may not be included in the analysis by project controller 602. These criteria are combinations of meeting (or failing to meet) certain thresholds, as analyzed by a tokenizer 603, a text aggregator 604, object themer 605, and word profiler 606. Device interface 601 may manage input/output communications to devices 560, and in some embodiments, to response database 607, over network 310.

Project controller 602 may manage an execution of an exchange of thought objects 510, whereby project controller 602 may manage receiving and distributing question objects 546 to devices 610, manage receiving and distributing thought objects 510, and receiving and distributing priority value objects via device interface 601.

In a preferred embodiment, tokenizer 603 segregates at least a portion of text, for example, as received in the thought objects 510. Tokenizer 603 may further separate the segregated at least portion of text into tokens, such that these tokens can be stemmed.

In a preferred embodiment, text aggregator 604 aggregates text, for example as received within the thought objects 510. The text to be aggregated may comprise, but not limited to, thought_summary 513 and/or thought_detail 514 associated to thought object 510. Text aggregator 604 aggregates text across one or more thought object 510 for themed and un-themed thought objects 510.

In a preferred embodiment, object themer 605 may be used by methods disclosed herein to generate a table of thought objects 510 that have associated themes. The table may identify all thought objects 510, that are associated with one or more themes, as determined by the stemming process, described in conjunction with methods disclosed herein. Further, object themer 605 may create a list of all unique stems across at least a portion of all thought objects 510. For instance, object themer 605 may parse thought objects 510 and extract stems for at least a portion of all thought objects 510, as generated by tokenizer 603.

In a preferred embodiment, word profiler 606 creates dictionaries and word sets. The word set may include stop words (that is, words that may be generally filtered out). In an embodiment, project controller 602 may receive one or more stop words from configuration database 609 (or in some embodiments from a device 610). Word profiler 606 may then fetch at least a portion of the stop words from the project controller 602 and save them in a stopWords word set. Similarly, word profiler 606 may fill a dictionary to include one or more words that may be received by a user device 611 and/or a leader device 612.

Response database 607 may store received response information from the plurality of devices 610. Object database 608 may provide database storage for objects 500, both pre-configured and objects with assigned data fields. Configuration database 609 may provide storage for systems configuration components, for example, at least, configuration for devices 610, system components 540, and the like. Library 614 may be configured as an internal library internal to system 600, having various reference libraries such as sklearn library, NLTK stem library, spACY library, and the like. It can be appreciated by one with ordinary skill in the art that the above referenced databases provide an exemplary set of databases required to implement components of system 600 and data necessary to execute the disclosed methods.

Object theming computer 600 may receive a plurality of connections via network 310 from a plurality of devices 610 which may comprise participant devices 611 and leader devices 612 for receiving objects and other information. Leader device 612 may compose and configure a project object 539 associated to one or more question objects 546 to solicit a plurality of thought objects 510 based on an arrangement of information in the form of an open-ended free-flow text that may be in the form of one or more questions. In a preferred embodiment, leader devices 612 may initiate and manage a project (as defined in project object 539 that comprises one or more question objects 546 via a process defined in process object 569) and at least a portion of participant devices 611 (i.e., those devices form which data has been received by object theming computer 600), comprise participant objects 611. In some embodiments, leader devices 612 may be considered participant devices and may act as both a leader device 612 and a participant device 611.

Detailed Description of Exemplary Embodiments

Figure 7:
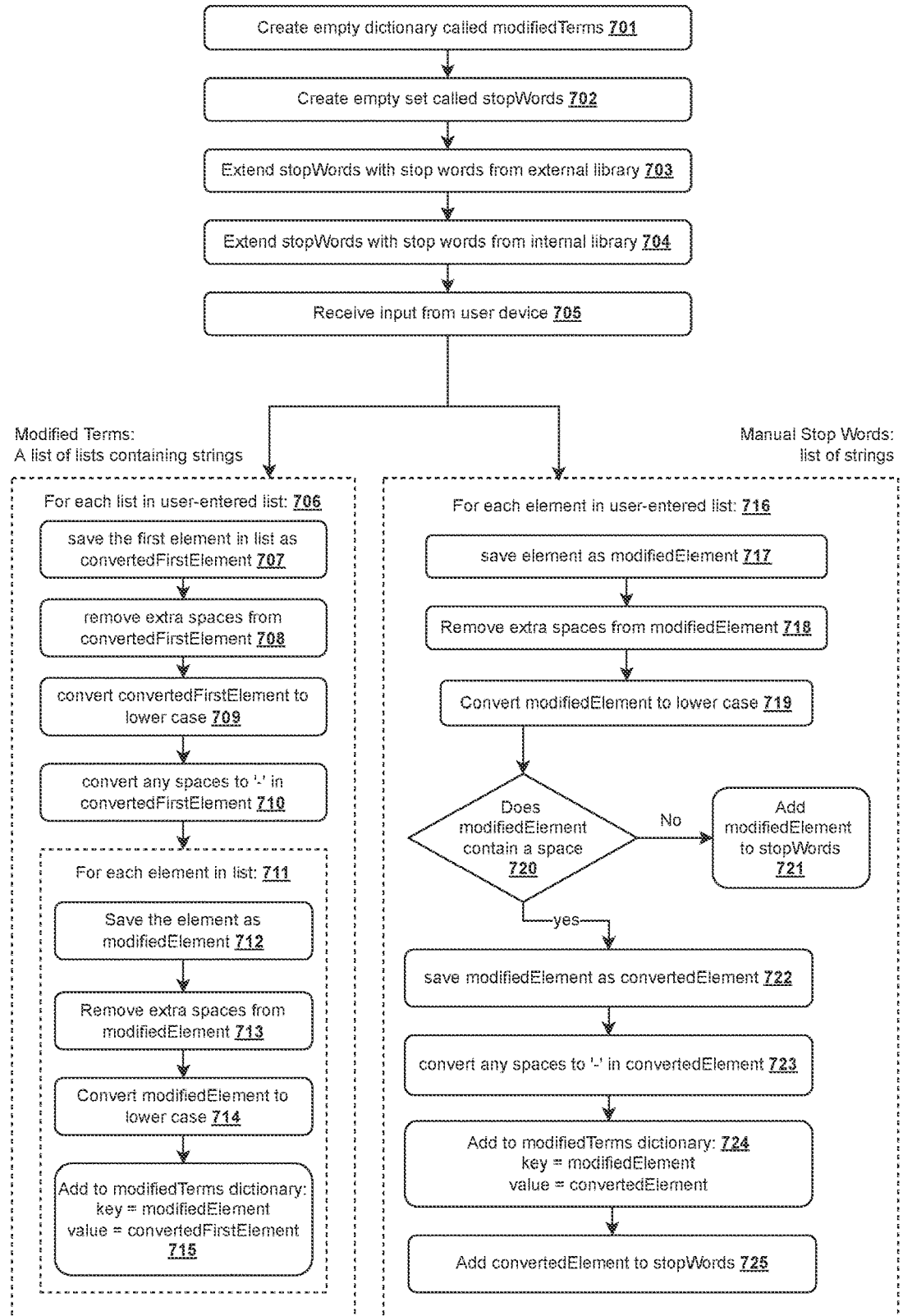
FIG. 7 is a flow diagram illustrating a method for initializing supporting variables, according to a preferred embodiment of the invention.

FIG. 7 is a flow diagram illustrating a method for initializing supporting variables, according to a preferred embodiment of the invention. According to the embodiment, in a first step 701, word profiler 606 may create an empty dictionary. The empty dictionary may be labeled as modifiedTerms. Word profiler 606 may then fill modifiedTerms to include one or more words that may be treated similarly to each other by a user device 611. In an embodiment, different terms such as "north van", "n van", and "north Vancouver", may all refer to the same noun, that is, a geolocation named, "North Vancouver". In an embodiment, word profiler 606 may remove extra spaces from such terms and also convert associated text of these terms to lowercase. The dictionary may then be formed by the word profiler 606 with each lower-case term as a "key", along with the first term in the set as "value". The space in between the words may be changed with the symbol "-". For instance, for the term "north van," a modifiedTerm to be included may be given as north-van. For example, the terms "vancouver" and "van" may be set keys, while the term "vancouver" may be set as the value.

In a next step 702, word profiler 606 may create an empty word set. The empty word set may be labeled as stopWords (as defined previously). In an embodiment, project controller 602 may receive one or more stop words from one or more participant devices 611. According to the embodiment, word profiler 606 may then fetch these stop words from project controller 602 and may remove spaces between words as well as convert the text of the stop-words to lower case. Further, if, for example, there is a space between two characters, word profiler 606 may convert the space to "-". Further, word profiler 606 may add the stop-word in the modifiedTerms dictionary, wherein the stop-word, with the space included, may be added as the "key" and the stop-word with the character "-" may be added as the "value."

In a next step 703, word profiler 606 may extend stopWords with stop words from an external library, such as library 613. In an embodiment, library 613 may contain a list of stop-words received from one or more of user devices 611, obtained from a hard-coded set, or otherwise obtained from a user through external sources. Library 613 may communicate with system 600 over network 310, such that system 600 may populate stopWords from the extended list as well as stop-words received directly from user devices 611.

In a next step 704, word profiler 606 may extend stopWords with stop-words from internal library. In an embodiment, internal library may be a library of words internal to system 600, such as library 614. In a next step 705, project controller 602 may receive an input from user device 611. The user input, in one embodiment, may comprise a list of words submitted by user device 611, for example, as thought objects 510. The user inputs may be aggregated (that is, into aggregatedText) as a user-entered list for further processing by project controller 602.

In an embodiment, for each list in a user-entered list, starting at a step 706, steps 707-715 may be performed by one or more components of the system 600 to populate modified terms designated by stopWords. Starting at step 707, project controller 602 may save the first element in the list as convertedFirstElement. In a next step 708, word profiler 606 may remove extra spaces from convertedFirstElement. In a next step 709, word profiler 606 may convert convertedFirstElement to a lower-case word. Further, in a next step 710, word profiler 606 convert any spaces within text contained in the convertedFirstElement to '-'.

Furthermore, beginning at a next step 711, steps 712-715 may be performed by one or more components of system 600 for each element in the list. For instance, in step 712, project controller 602 may save the covertedFirstElement as modifiedElement, after word profiler 606 may process convertedFirstElement by removing spaces and converting it into lower case. In a next step 713, word profiler 606 may remove extra spaces from modifiedElement. In a next step 714, word profiler 606 may convert modifiedElement to lower case.

In a next step 715, project controller 602, may add modifiedElement to a modifiedTerms dictionary, such that the modifiedElement is saved as a key while the convertedFirstElement is saved as a value.

In an embodiment, starting at step 716, system 600 may process the manual stop-words for each element in user-entered list, such as described in steps 717-725, to further populate stopWords. Starting at step 717, project controller 602 may save each element as modifiedElement. In a next step 718, word profiler 606 may remove extra spaces from modifiedElement. In a next step 719, word profiler 606 may convert modifiedElement to lower case. In a next step 720, project controller 602 may determine if modifiedElement contains a space. In case it is determined, by project controller 602 that the modifiedElement does not contain any space characters, project controller may add modifiedElement to stopWords, in a next step 721.

Otherwise, if it is determined by project controller 602 that the modifiedElement contains any space characters, in a next step 722, project controller 602 may save modifiedElement as convertedElement. In a next step 723, word profiler 606 may replace any spaces in convertedElement with '-'. Further, in a next step 724, project controller 602 may add the modifiedElement as key and convertedElement as value, to modifiedTerms dictionary, that is, modifiedTermDict.

Finally, in a next step 725, project controller 602 may add the convertedElement to stopWords.

Figure 8:
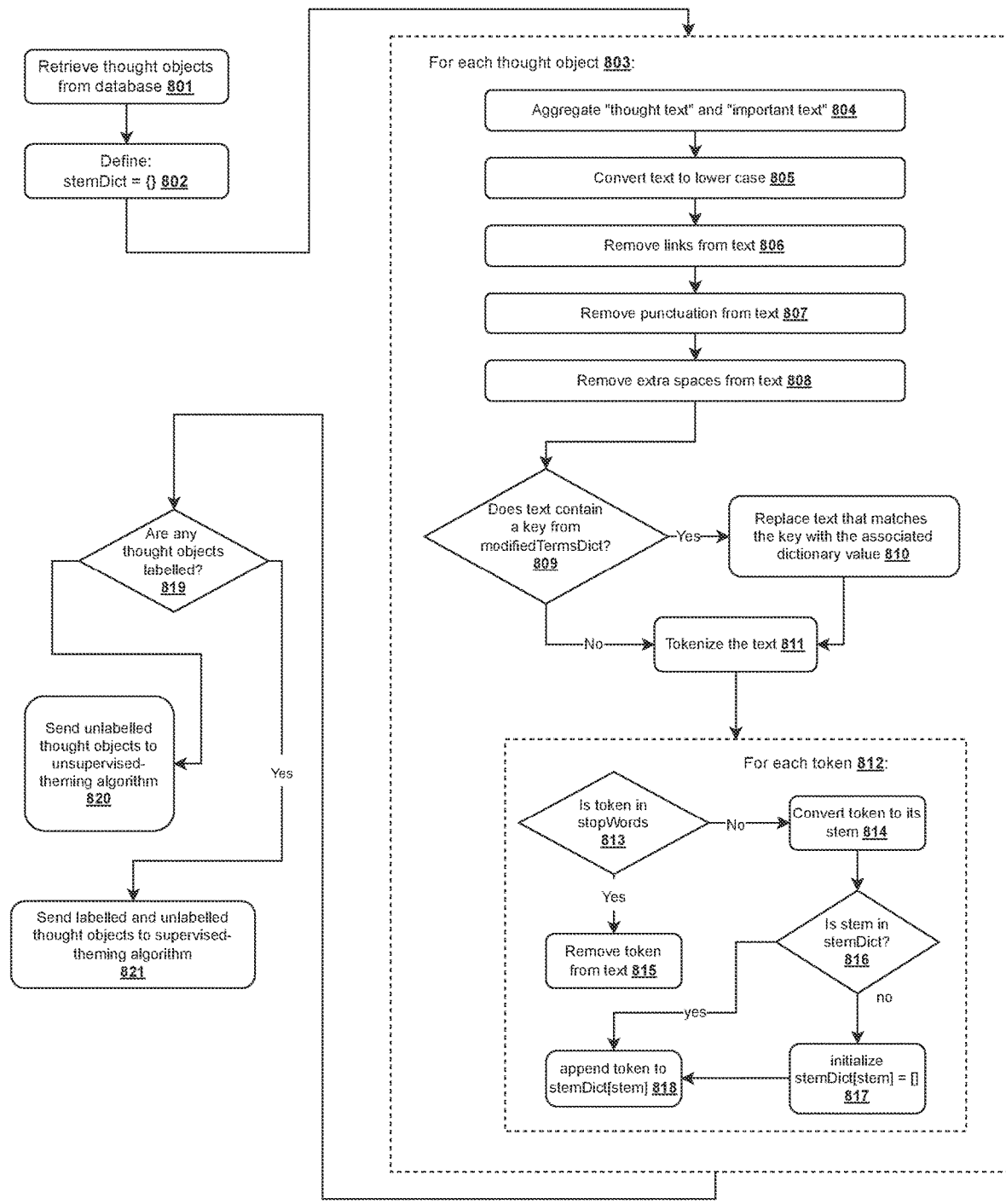
FIG. 8 is a flow diagram illustrating a method for processing thought objects, according to a preferred embodiment of the invention.

FIG. 8 is a flow diagram illustrating a method for processing thought objects 510, according to a preferred embodiment of the invention. According to the embodiment, in a first step 801, project controller 602 may retrieve thought objects 510 from database. In an embodiment, project controller 602 may retrieve thought objects 510 from object database 608 or directly receive thought objects 510 from one or more user devices 611.

In a next step 802, project controller 602 may define stemDictionary such that stemDict ={ }. The stemDictionary may contain a stem, which may be a part of a term used in information retrieval indices. Within the stemDictionary, each word may be considered to have a stem (defined, for example, in an .STM file or database table) and one or more possible suffixes (defined, for example, in an .SUF file or database table). For example, for the terms "go" and "going", "go" may be considered as the stem and "ing" as the suffix. Entries in the .STM file may consist of the stem word (go) followed by a blank, and then an index entry in the suffix file (.SUF) shall be "go 1". This index indicates which suffix values are acceptable for an associated stem word.

In an embodiment, for each thought object 510, steps 804-818 may be performed by one or more components of system 600, starting at step 803. In next step 804, text aggregator 604 may aggregate text within thought object 510, that is, thought_summary 513 and/or thought_detail 514. In an embodiment, text aggregator 604 may aggregate thought_summary 513 and thought_detail 514 per thought object 510, both for themed thought objects 510 and other un-themed thought objects 510.

In a next step 805, word profiler 606 may convert the aggregated text to lower case. In a next step 806, word profiler 606 may remove links from the aggregated text. The links, in an embodiment, may be hyperlinks to a webpage and/or links to other text in a document. In a next step 807, word profiler 606 may remove punctuation from the aggregated text. Further, in a next step 808, word profiler 606 may remove extra spaces from the aggregated text.

In a next step 809, project controller 602 may determine whether the aggregated text contains a key from modifiedTermsDict. In case it is determined, by project controller 602, that the aggregated text contains a key from modifiedTermsDict, in a next step 810, project controller 602 may replace the aggregated text that matches a key with an associated dictionary value.

Otherwise, if it is determined, by project controller 602, that the aggregated text does not contain a key from modifiedTermsDict, or after a replacement of aggregated text by project controller 602 in step 810, in a next step 811, tokenizer 603 may tokenize the aggregated text to generate one or more tokens.

In an embodiment, for each such token created by tokenizer 603, system 600 may perform the steps 813-818 starting at a step 812. In step 813, tokenizer 603 may determine if the generated token is present in stopWords. If it is determined, by tokenizer 603, that the generated token is not present in stopWords, tokenizer 603, in a next step 814, may convert the token to its stem. In an embodiment, stemming may be performed to produce morphological variants of a root or base word. Stemming programs may commonly be referred to as stemming algorithms or stemmers. For instance, a stemming algorithm may reduce the words "chocolates", "chocol" to the root word, "chocolate" and "retrieval", "retrieved", "retrieves" reduce to the stem "retriev", and the like.

In an embodiment, tokenizer 603 may convert one or more tokens to one or more stems using a NLTK stem library, which may be extracted from external library 613 or internal library 614 (for example, from a library for tokenization known in the art).

Referring again to FIG. 8, if it is determined, in step 813, that the token is present in the stopWords, in a next step 815, tokenizer 603 may remove the token from the tokens of the aggregated text. In a next step 816, tokenizer 603 may determine if the stem is present in stemDict. If the stem is not present in stemDict, in a next step 817, tokenizer 603 may initialize a process for stemDict, given by: stemDict [stem]=[ ]. In a next step 818, tokenizer 603 may then append the token to stemDict[stem]. Otherwise, in case it is determined, by tokenizer 603, that the stem is present in stemDict, tokenizer 603 may directly append token to stemDict[stem], in step 818.

Figure 9:
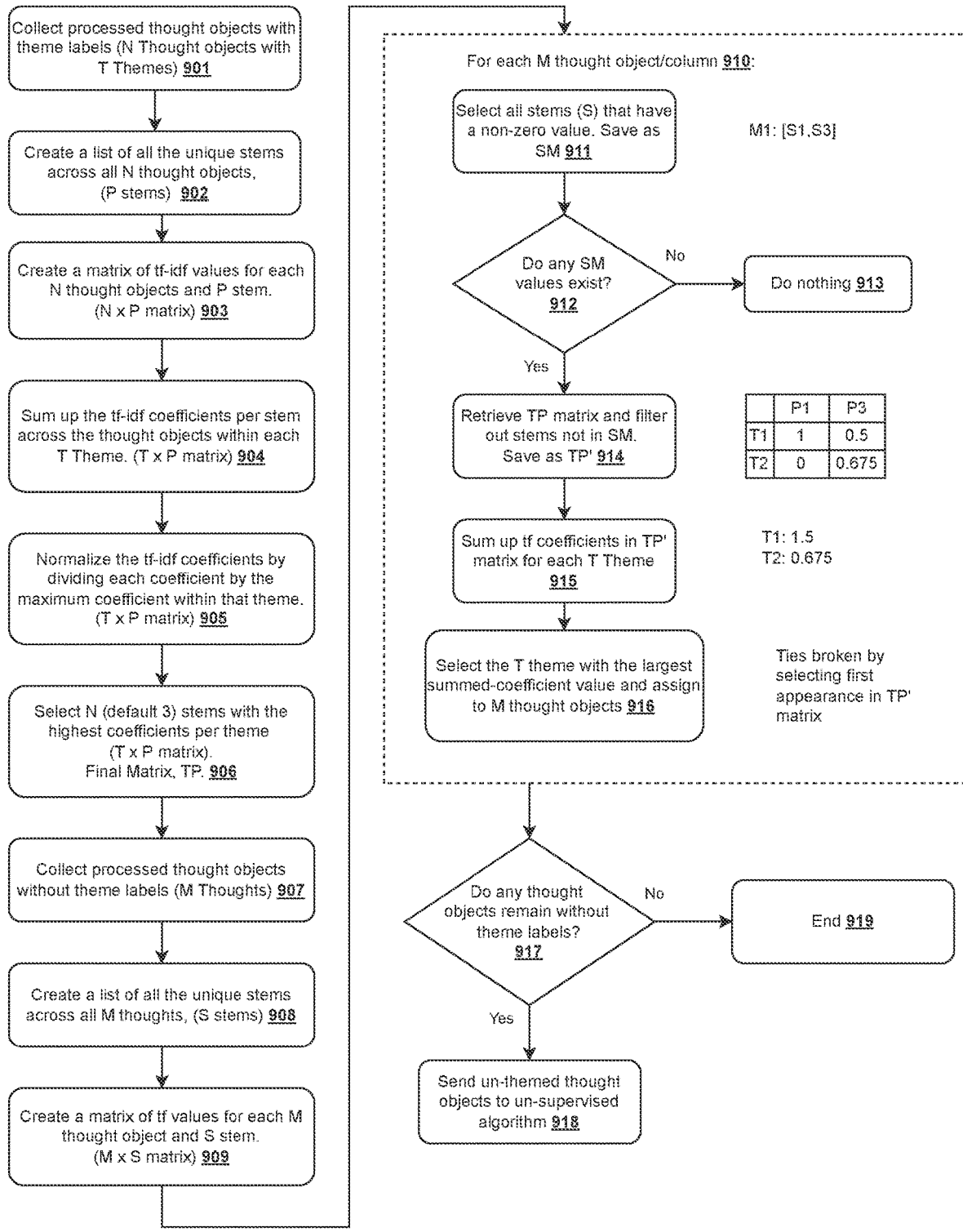
FIG. 9 is a flow diagram illustrating a method for supervised theming, according to a preferred embodiment of the invention.

FIG. 9 is a flow diagram illustrating a method for supervised theming, according to a preferred embodiment of the invention. According to the embodiment, in a first step 901, project controller 602 may collect processed thought objects 510 having associated themes. In an embodiment, object themer 605 may then generate a table of N thought objects 510 that may be associated with T themes. The "N×T" table may identify all thought objects 510, that may be associated with one or more themes, as determined by the stemming process, described in conjunction with FIG. 8.

In a next step 902, object themer 605 may create a list of all unique stems (P stems) across all N thought objects 510. For instance, object themer 605 may parse the N thought objects 510 that may be currently associated with T themes, and extract stems from stemDict for all N thought objects 510, as generated by tokenizer 603.

In a next step 903, project controller 602 may create a matrix of tf-idf values for each of the N thought objects 510 and P stems, to create a "N×P" matrix. A tf-idf value may be a value pertaining to term frequency-inverse document frequency, intended to reflect how important a word is to a document in a collection of corpuses. In an embodiment, the term frequency may be calculated, by project controller 602, using the following exemplary sequence:

tf(w, d)=log(1+f(w, d)), wherein d denotes a given thought from a dataset, w is a given word in a thought, and f(w, d) denotes a frequency of the word w in the thought d. Further, the inverse term frequency may be computed by project controller 602, based on the following exemplary sequence:

$$idf(w, D) = \log\left(\frac{N}{f(w, D)}\right),$$

wherein D denotes a collection of all thoughts. The tf-idf score may be computed by project controller 602 using the following exemplary sequence:

tfidf(w, d, D)=tf(w, d)*idf(w, D).

For such a computation, project controller 602 may utilize filtered tokenized stems of themed thought objects, as generated using tokenizer 603, as an input value. This value may be denoted as M vectors of all stemmed tokens. The output value may then be a coefficients matrix, generated by project controller 602, that may denote a cross relation between the M vectors and the number of all stems in the corpus of themed thought objects (S), in an M×S matrix. In some embodiments, each coefficient may represent the tf-idf value per thought object 510, for that particular stem.

In another embodiment, project controller 602 may create the N×P matrix for themed thought objects 510, using, for example, a "Scikit-Learn" or "sklearn" library.

Referring again to FIG. 9, in a next step 904, project controller 602 may calculate a sum of the tf-idf coefficient values per stem P across the thought objects 510 within each of the T themes, to generate a T×P matrix. In a next step 905, project controller 602 may normalize the tf-idf coefficient values by dividing each coefficient value by the maximum coefficient value within that theme T.

In a next step 906, project controller 602 may select n stems P with the highest coefficients per theme within the T×P matrix. In an embodiment, the default number of stems P that may be selected, may be set to 3 by the project controller 602. Based on the selection of the n stems P, a final T×P matrix may be generated by the project controller 602. In a next step 907, project controller 602 may collect processed thought objects 510 M, that may have no associated themes.

In a next step 908, project controller 602 may create a list of all unique stems across all M thought objects. The unique stems may be denoted as S. In a next step 909, project controller 602 may create a matrix of term frequency (tf) values for each of the M thought objects 510 and S stems, thereby creating a M×S matrix.

In an embodiment, one or more components of system 600 may process each of the M thought objects 510 populated in each column of the M×S matrix, starting at step 910. In a next step 911, project controller 602 may select all stems S that have a non-zero value. In an embodiment, the non-zero values may be stored, by project controller 602 in object database 608, as SM. In a next step 912, if the non-zero values SM do not exist, project controller 602 may do nothing at step 913. Otherwise, if the non-zero values exist, in a next step 914, project controller 602 may retrieve the T×P matrix and filter out stems that are not present in SM. Project controller 602 may save such values as a TP' matrix. For instance, stems P1 and P3, with, for example, values 1 and 0.5 for theme T1, respectively, and, for example, values 0 and 0.675, for theme T2, respectively, may be extracted and saved by project controller 602.

In a next step 915, project controller 602 may compute a sum of the tf coefficients in TP' matrix for each of the themes T. Referring again to the above example, the sum for theme T1 would be, for example, 1+0.5=1.5; and the sum for the theme T2 would be, for example, 0+0.675=0.675. In a next step 916, project controller 602 may select the theme T with the largest summed-coefficient value and assign the theme T to each M thought object 510. In the above example, project controller may assign theme T1, with a larger summed-coefficient value as 1.5, to the thought object 510.

In a next step 917, project controller 602 may determine whether any thought objects 510 remain without themes. In case such thought objects 510 remain, in a next step 918, project controller 602 may send such un-themed thought objects 510 to un-supervised algorithm. Otherwise, the method 900 ends at a next step 919.

Figure 10:
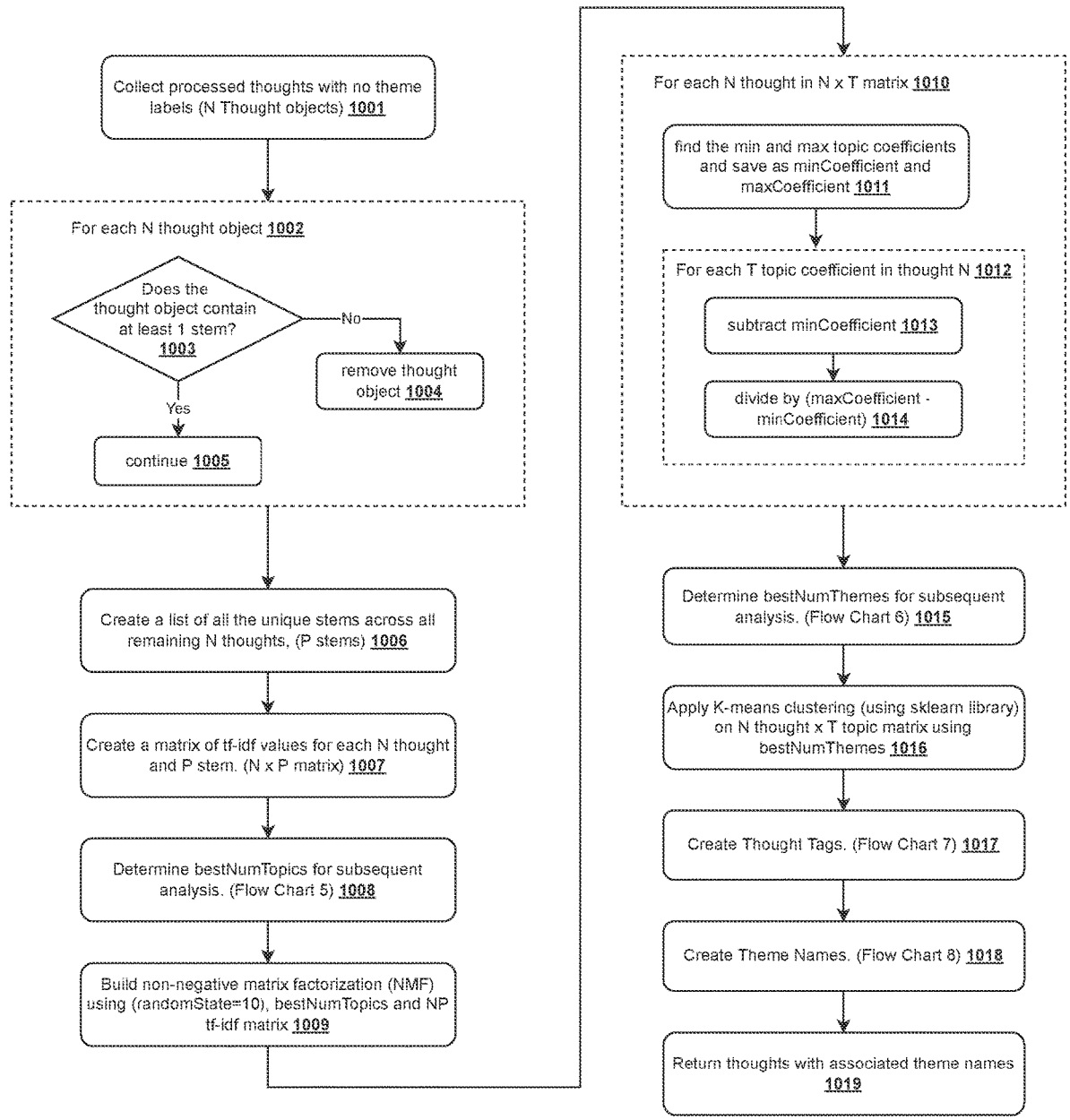
FIG. 10 is a flow diagram illustrating a method for unsupervised theming, according to a preferred embodiment of the invention.

FIG. 10 is a flow diagram illustrating a method for unsupervised theming, according to a preferred embodiment of the invention. According to the embodiment, in a first step 1001, project controller 602 may collect one or more processed thought objects 510 that may have no associated themes (N thought objects). For each N thought object 510, starting at a next step 1002, system 600 may perform steps 1003-1005.

In step 1003, project controller 602 may determine whether a thought object 510 contains at least one stem. In a case where it is determined, by project controller 602, that the thought object 510 does not contain a stem, in a next step 1004, project controller 602 may remove the thought object 510 from processing. Otherwise, in a next step 1005, project controller 602 may continue processing.

In a next step 1006, project controller 602 may create a list of all the unique stems P across all remaining N thought objects 510. In a next step 1007, project controller 602 may then create a matrix of tf-idf values for each such N thought and P stem, creating an N×P matrix.

In a next step 1008, project controller 602 may determine a value for bestNumTopics for subsequent analysis. The subsequent analysis is described herein with reference to FIG. 11. In an embodiment, the value for bestNumTopics may be determined, by project controller 602, by executing a topic modeling approach for a specified range of number of topics. The minimum number of topics and the maximum number of topics, of the range of topics, may be determined by project controller 602 by utilizing a number of thought objects 510, which do not exceed a preconfigured number of topics (e.g., 15 topics). In an embodiment, project controller 602 may run the topic modeling approach three times per number of total such topics.

Further, in a next step 1009, project controller 602 may build a non-negative matrix factorization (NMF) using a randomState value equaling, for example, 10, the value for bestNumTopics and the N×P tf-idf matrix. In an embodiment, the output of the NMF on N×P tf-idf matrix may generate two matrices. i.e., a N×T (thought versus topic matrix) and a T×P (topics versus stems) matrix.

In an embodiment, project controller 602 may perform steps 1011-1014 for each thought object 510 in the N×T matrix, starting at step 1010. In step 1011, project controller 602 may determine minimum and maximum coefficients for a topic. The minimum and maximum coefficients may be saved as minCoefficient and maxCoefficient, by project controller 602, to configuration database 609. Further, for each topic coefficient for topic T, in N thought object 510, at a step 1012, project controller 602, at a next step 1013, may subtract minCoefficient from maxCoefficient to generate value for (maxCoefficient−minCoefficient). Further, minCoefficient may be subtracted from the value of topic coefficient. In a next step 1014, project controller 602 may divide by the resultant value from the earlier computed value of (maxCoefficient−minCoefficient).

In a next step 1015, project controller 602 may determine a value of bestNumThemes for subsequent analysis. The subsequent analysis is further described in conjunction with FIG. 13. In an embodiment, project controller 602 may use K-means clustering and elbow plot to determine the best-NumThemes. For instance, the coefficients of each topic T per thought object 510, for a range of themes related to the number of un-themed thought objects, may be applied. Each normalized topic coefficient per thought object may be taken as input. Further, the minimum and maximum coefficient value to determine the range may be based on a number of thought objects, which may not exceed, for example, 15 themes.

In a next step 1016, project controller 602 may apply k-means clustering (e.g., using the sklearn library) on N thought objects 510 for T topic matrix, i.e., N×T matrix, using the value of bestNumThemes. Further, in a next step 1017, word profiler 606 may create thought tags. The creation of thought tags, by word profiler 606, is described in further detail with reference to FIG. 14A.

In a next step 1018, object themer 605 may create theme names. The creation of theme names is further detailed in FIG. 14B. In a next step 1019, object themer 605 may return thought objects 510 with associated theme names created for the thought objects 510.

Figure 11:
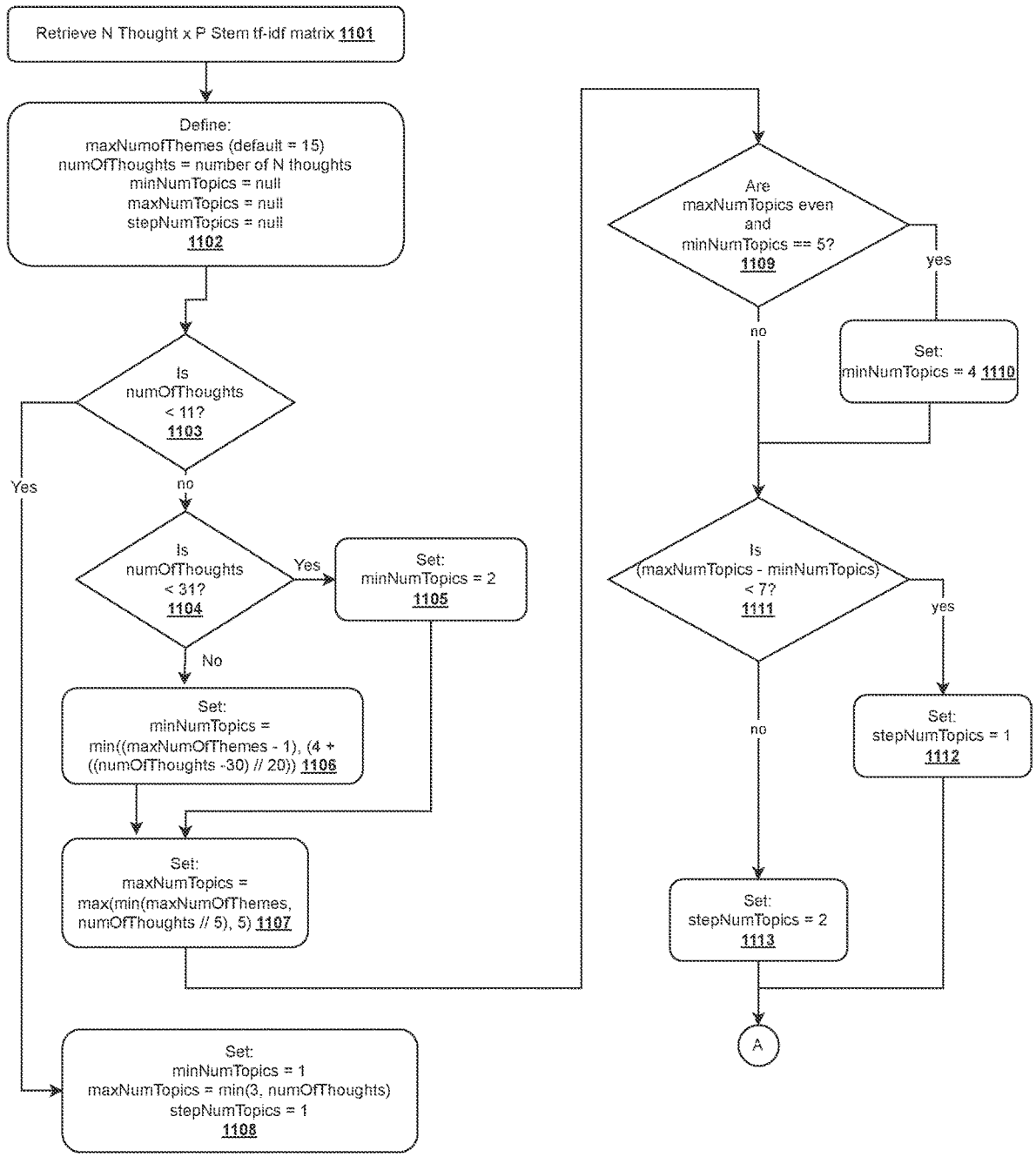
FIG. 11 is a flow diagram illustrating a method for finding a range of topics, according to a preferred embodiment of the invention.

FIG. 11 is a flow diagram illustrating a method for finding a range of topics with a most stable value, according to a preferred embodiment of the invention. According to the embodiment, in a first step 1101, project controller 602 may retrieve the N×P tf-idf matrix. In a next step 1102, object themer 605 may define a maximum number of themes, given by maxNumofThemes. In an embodiment, the default maximum number of themes may be set, for example, at 15. Further, object themer 605 may also define number of thought objects 510 N, given by numOfThoughts, a minimum number of topics, given by minNumTopics, a maximum number of thought objects, given by maxNumTopics, as well as a step number of topics, given by stepNumTopics. In an embodiment, the values for minNumTopics, maxNumTopics, and setNumTopics, may be set to null, by object themer 605.

In a next step 1103, project controller 602 may determine whether the value of numOfThoughts is less than a preconfigured amount, for example, 11. If the value is greater than 11, in a next step 1104, project controller 602 may again determine if value of numOfThoughts is less than a preconfigured amount, for example, 31. If it is determined, by project controller 602, that the value of numOfThoughts is less than 31, in a next step 1105, project controller 602 may set a value of minNumTopics to a preconfigured amount, for example, 2. Otherwise, if it is determined, by project controller 602, that the value of numOfThoughts is not less than 31, in a next step 1106, project controller 602 may set a value of minNumTopics using the following exemplary sequence:

minNumTopics=min((maxNumOfThemes−1),(4+((numOfThoughts−30)//20)).

Further, in a next step 1107, project controller may set a value of maxNumTopics by using the following exemplary sequence:

maxNumTopics=max(min(maxNumOfThemes, numOfThoughts//5), 5).

Referring again to step 1103, if it is determined by project controller 602 that value of numOfThoughts is less than 11, in a next step 1108, project controller 602 may set value of minNumTopics as 1, a value of maxNumTopics as 3 or as value of numofThoughts, whichever is lower, and a value of stepNumTopics as 1.

In a next step 1109, project controller 602 may determine whether a value of maxNumTopics is, for example, an even number and a value of minNumTopics equals, for example, 5; if it is determined by project controller 602 that both these conditions are met, in a next step 1110, project controller 602 may set a value of minNumTopics to, for example, 4. Otherwise, in a next step 1111, project controller 602 may further determine whether a difference between the value of maxNumTopics and minNumTopics is less than, for example, 7. If it is determined, by project controller 602, that the difference in the values of maxNumTopics and minNumTopics is less than 7, in a next step 1112, project controller 602 may set a value of stepNumTopics as, for example, 1. Otherwise, in a next step 1113, project controller may set the value of stepNumTopics to, for example, 2. The method may then continue to FIG. 12A.

Figure 12A:
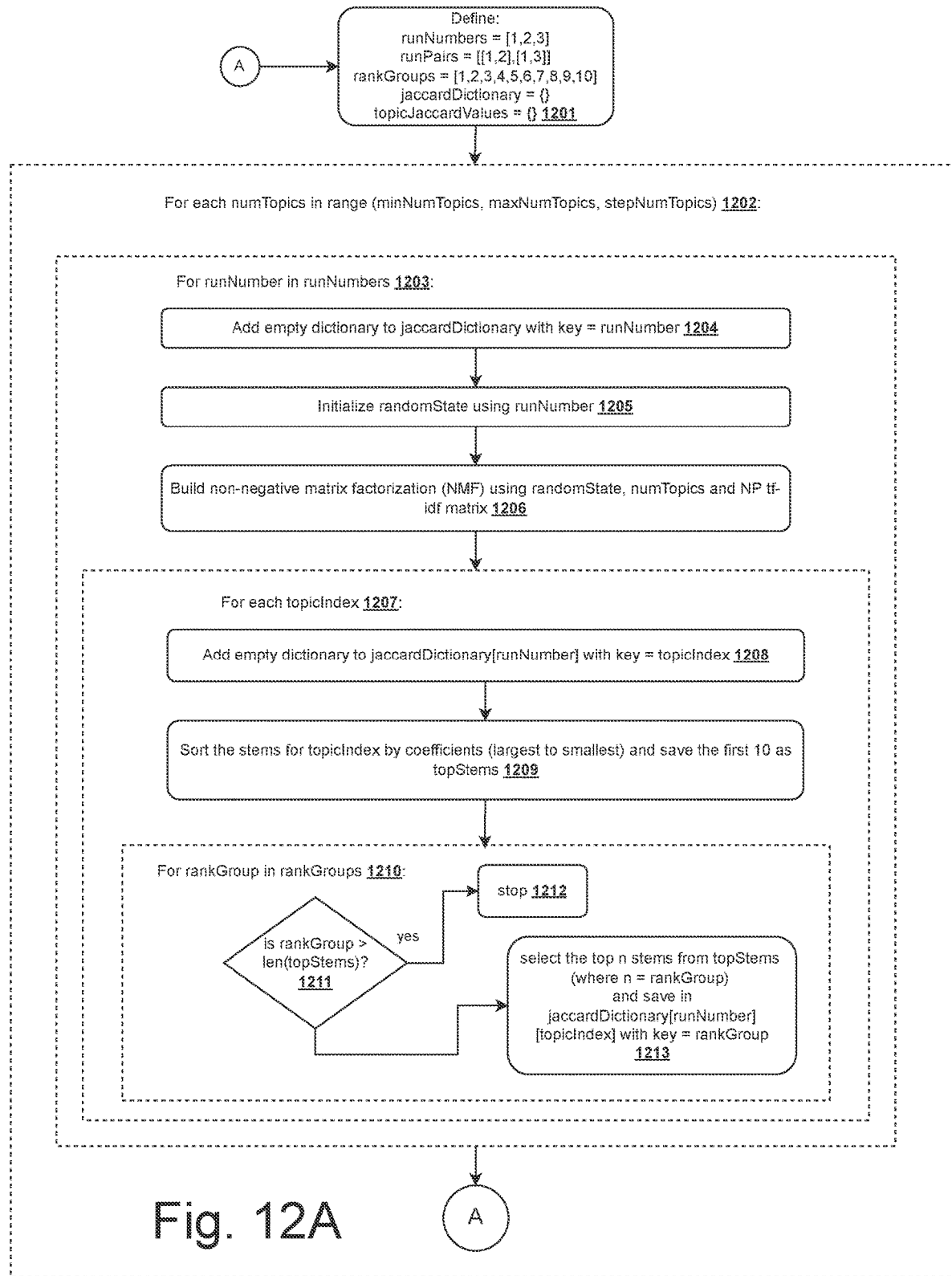
FIG. 12A-12C are flow diagrams illustrating a method for finding a number of topics with a most stable value, according to a preferred embodiment of the invention.
Figure 12B:
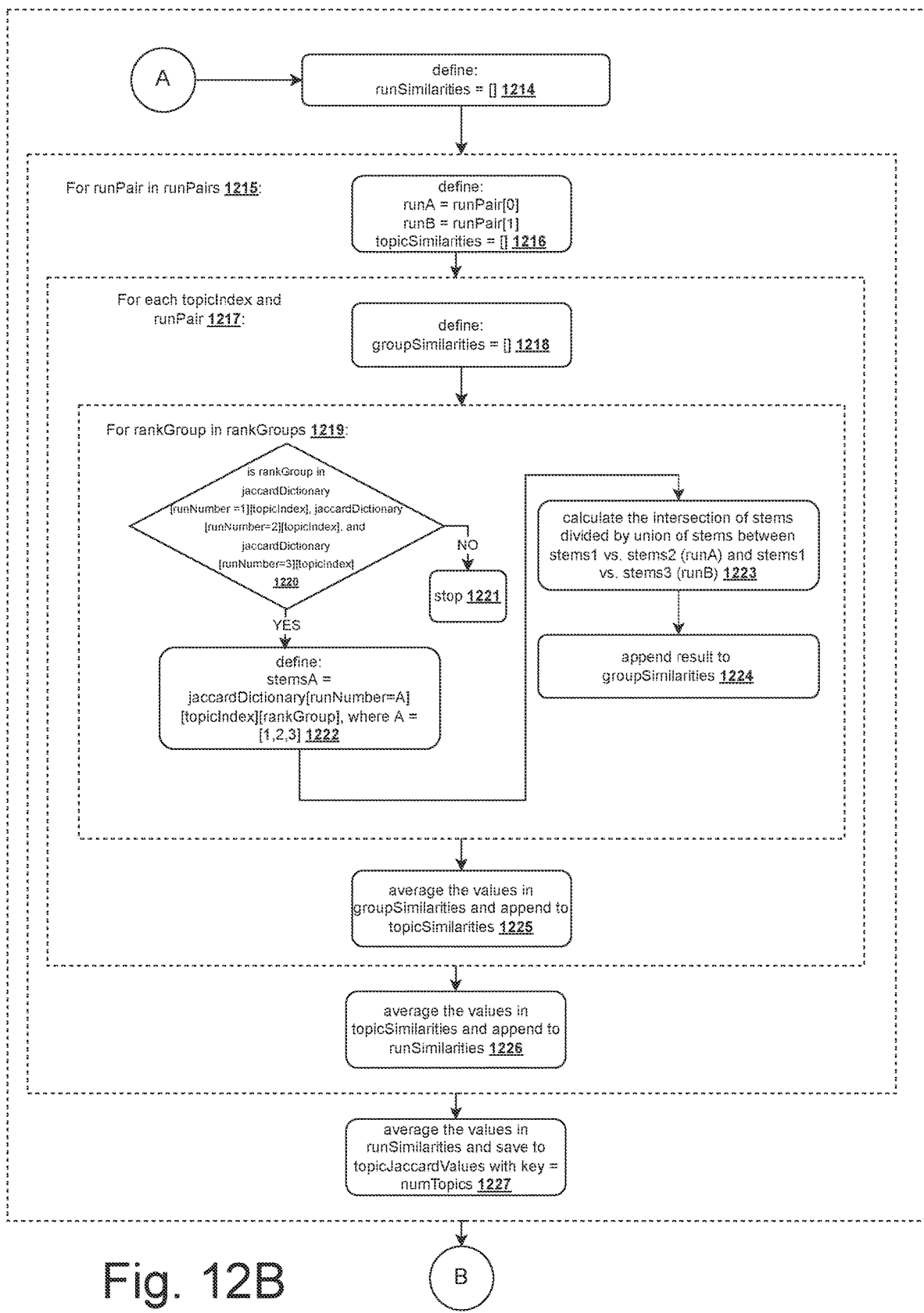
Figure 12C:
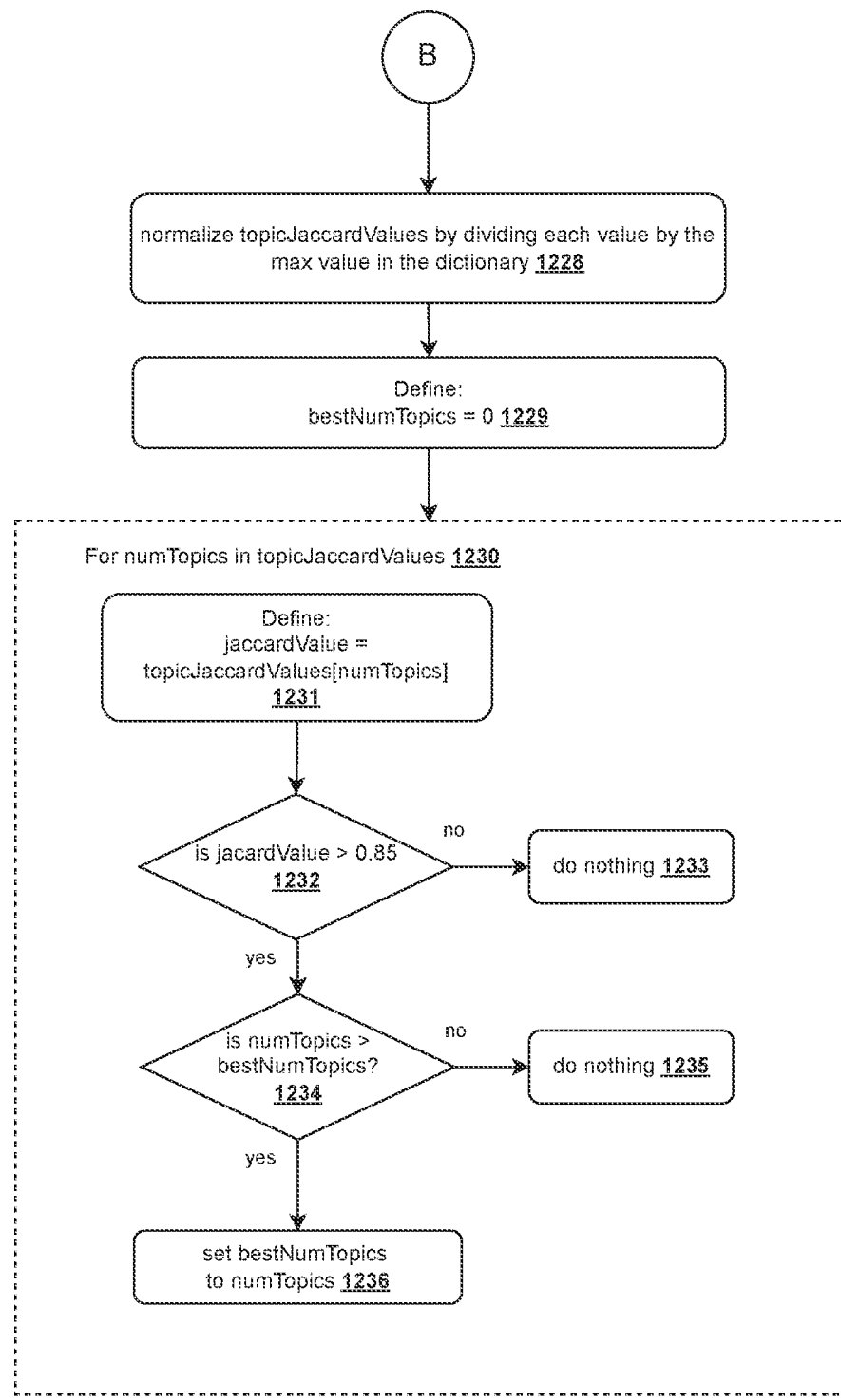

FIG. 12A-12C is flow diagrams illustrating a method for finding a preferred number of topics with a most stable value, according to a preferred embodiment of the invention. According to the embodiment, in a first step 1201 (referring to FIG. 12A), project controller 602 may define the following values: runNumbers=[1,2,3]; runPairs=[[1,2],[1,3]]; rankGroups=[1,2,3,4,5,6,7,8,9,10]; jaccardDictionary={ }; and topicJaccardValues={ }. In an embodiment, the runNumbers may be a number of times that a Jaccard algorithm may be run to determine one or more number of topics comprising the most stable stems. The Jaccard index, is a statistic used to determine how similar and/or diverse a sample set is. A Jaccard coefficient may measure similarity between finite set and may be defined as the size of the intersection over the size of the union of sample sets. Further, runPairs may be pairing of sample sets of topics, for which the Jaccard algorithm may be run together by project controller 602. Furthermore, the value of rankGroups may be defined based on, for example, a top 10 ranked stems per topic. A Jaccard dictionary may be initiated by project controller 602, and values for topics, given by topicJaccardvalues may be set.

In a next step 1202, for each value of numTopics in a range given by values of minNumTopics, maxNumTopics, and stepNumTopics, steps 1203-1227 may be performed by one or more components of system 600.

Starting with step 1203, for each runNumber in the runNumbers list, project controller 602, in a next step 1204, may add an empty dictionary to jaccardDictionary with having a key set to the runNumber. In a next step 1205, project controller 602 may initialize a randomState using runNumber. In an embodiment, the scikit-learn library (sk-learn library) may use random permutations for generating random numbers drawn from a variety of probability distributions. The random state provided may be used as a seed to a random number generator such that random numbers may be generated in the same order when running the Jaccard algorithm.

In a next step 1206, project controller 602 may build a non-negative matrix factorization (NMF), using values for randomState, numTopics and the N×P matrix. Further, in a next step 1207, for each value of topicIndex, project controller 602, starting at step 1208, may add an empty dictionary to the jaccardDictionary[runNumber] having value of key as the value of topicIndex. In a next step 1209, project controller 602 may sort the stems for topicIndex by the value of their coefficients (e.g., largest to smallest). Project controller 602 may then save the first, for example, 10 stems in a group given by topStems, within the configuration database 609.

Further, in a next step 1210, for each rankGroup in rankGroups, project controller 602 may perform steps 1211-1213. In step 1211, project controller 602 may determine whether the value of rankGroup is greater than the length of topStems as given by len(topStems). If it is determined, by project controller 602, that the value of rankGroup is greater than the len(topStems), the method stops at step 1212. Otherwise, in a next step 1213, project controller 602 may select the top n stems from topStems, wherein n may be the value rankGroup. Further, project controller 602 may save the value of topicIndex having value of the key as value of rankGroup, in the jaccardDictionary[runNumber]. The method may then continue to FIG. 12B.

FIG. 12B continues processing at step 1214, wherein project controller 602 may define: runSimilarities=[ ]. In a next step 1215, for each runPair in runPairs, project controller 602, at a step 1216, may define: runA as runPair[0]; runB as runPair[1]; and topicSimilarities=[ ]. In a next step 1217, for each topicIndex and runPair, project controller 602 may define groupSimilarities=[ ], at step 1218. In a next step 1219, for each rankGroup in the rankGroups, project controller 602 may determine, in step 1220, whether a rankGroup is found in JaccardDictionary [runNumber=1][topicIndex] and jaccardDictionary[runNumber=2][topicIndex] and; jaccardDictionary[runNumber=3][topicIndex]. If the rankGroup is not found, the method may stop at a next step 1221. Otherwise, in a next step 1222, project controller 602 may define: stemsA as jaccardDictionary[runNumber=A][topicIndex][rankGroup], wherein A may be 1, 2, and 3. That is, project controller 602 may define stems1=jaccardDictionary[runNumber=1][topicIndex][rankGroup]; stems2=jaccardDictionary[runNumber=2][topicIndex][rankGroup]; and stems3=jaccardDictionary[runNumber=3][topicIndex][rankGroup].

In a next step 1223, project controller 602 may calculate an intersection of stems divided by union of stems between stems1 and stems2, for runA, as well as between stems1 and stems3, for runB. Further, in a next step 1224, project controller 602 may append the result of intersection divided by union of stems to groupSimilarities. In a next step 1225, project controller 602 may compute an average of the values in groupSimilarities and append the average value to the value of topicSimilarities. Further, in a next step 1226, project controller 602 may calculate an average value of the values in topicSimilarities and append the average value to runSimilarities. Furthermore, in a next step 1227, project controller 602 may compute an average value of the values in runSimilarities and save the average value to topicJaccardValues with key as numTopics. The method may then move to FIG. 12C.

FIG. 12C continues processing at step 1228, wherein project controller 602 may normalize topicJaccardValues by dividing each such value by the maximum value in the jaccardDictionary. In a next step 1229, project controller 602 may define a value of bestNumTopics set to 0. Further, in a next step 1230, for each value of numTopics in topicJaccardValues, project controller 602 may perform steps 1231-1236.

In step 1231, project controller 602 may first define a jaccardValue and extract the value from function topicJaccardValues[numTopics]. In a next step 1232, project controller 602 may determine if jacardValue is greater than 0.85. If it is determined, by project controller 602, that the jaccardValue is not greater than 0.85, no further step may be performed by project controller 602, as shown in step 1233. Otherwise, in a next step 1234, project controller 602 may further determine if the value of numTopics is greater than the value of bestNumTopics. If it is determined, by project controller 602, that the value of numTopics is not greater than the value of bestNumTopics, no further step may be performed by project controller 602, as shown in step 1235. Otherwise, in a next step 1236, project controller 602 may set value of bestNumTopics to value of numTopics.

Figure 13:
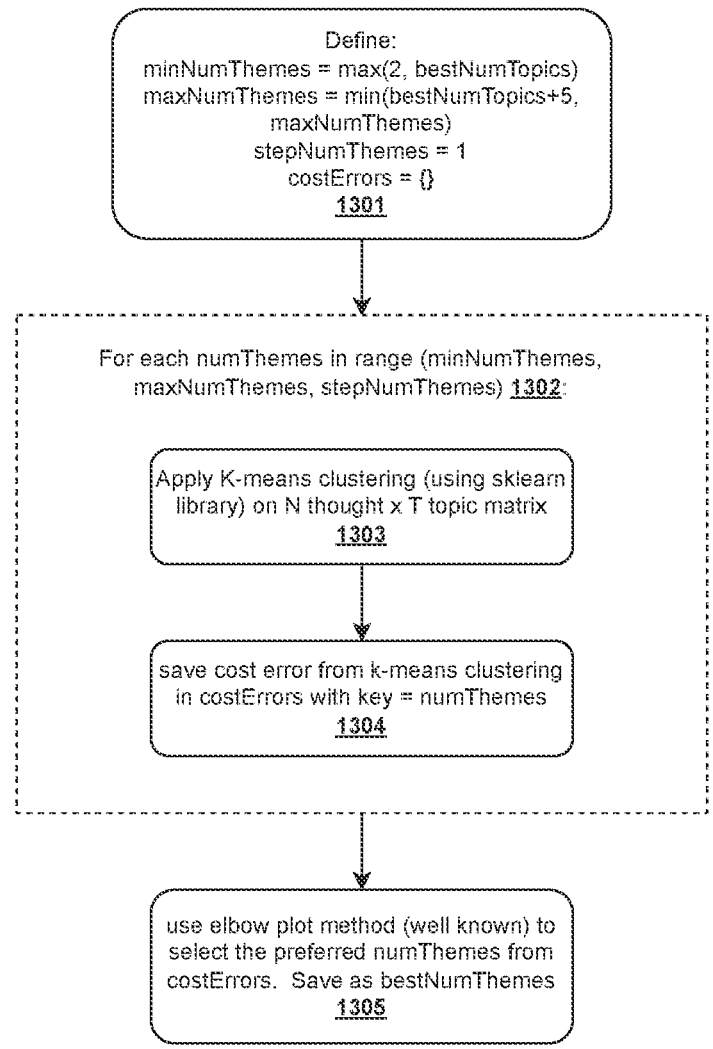
FIG. 13 is a flow diagram illustrating a method for finding the preferred number of themes, according to a preferred embodiment of the invention.

FIG. 13 is a flow diagram illustrating a method for finding the preferred number of themes, according to a preferred embodiment of the invention. According to the embodiment, in a first step 1301, project controller 602 may execute a function for minNumThemes as given by the following exemplary sequence:

minNumThemes=max(2, bestNumTopics).

Further, project controller 602 may define a function for maxNumThemes given by the following exemplary sequence:

maxNumThemes=min(bestNumTopics+5, maxNumThemes).

Furthermore, project controller 602 may also set a value for stepNumThemes given as, for example, 1 and define a costErrors as { }.

Starting step 1302, for each numThemes in a range given by: (minNumThemes, maxNumThemes, stepNumThemes), project controller 602 may perform steps 1303 and 1304. In step 1303, project controller may apply k-means clustering (using a sklearn library) on the N×T matrix where the desired number of clusters is equal to the numThemes value from the present iteration. Further, in a next step 1304, project controller 602 may save value of cost error, determined from the applied clustering, to the costErrors whilst setting value of the key equal to the value of numThemes.

In a next step 1305, project controller 602 may operate an elbow plot algorithm in order to select a preferred value for numThemes from the values of costErrors. This preferred value of numThemes may be saved as the bestNumThemes, by project controller 602. In one or more embodiments, project controller 602 may determine the preferred number of themes by using k-means clustering and elbow plot by applying coefficients of each topic per thought object 510 for a range of themes related to the number of un-themed thought objects 510. K-means clustering may be performed using a library, such as the sklearn library comprising, in some embodiments, a custom elbow plot. In an embodiment, project controller 602 may use the topic coefficient per thought object 510, as an input to the algorithm and minimum, step and maximum values in the range are determined by the number of thought objects (not exceeding, for example, 15 themes).

Figure 14A:
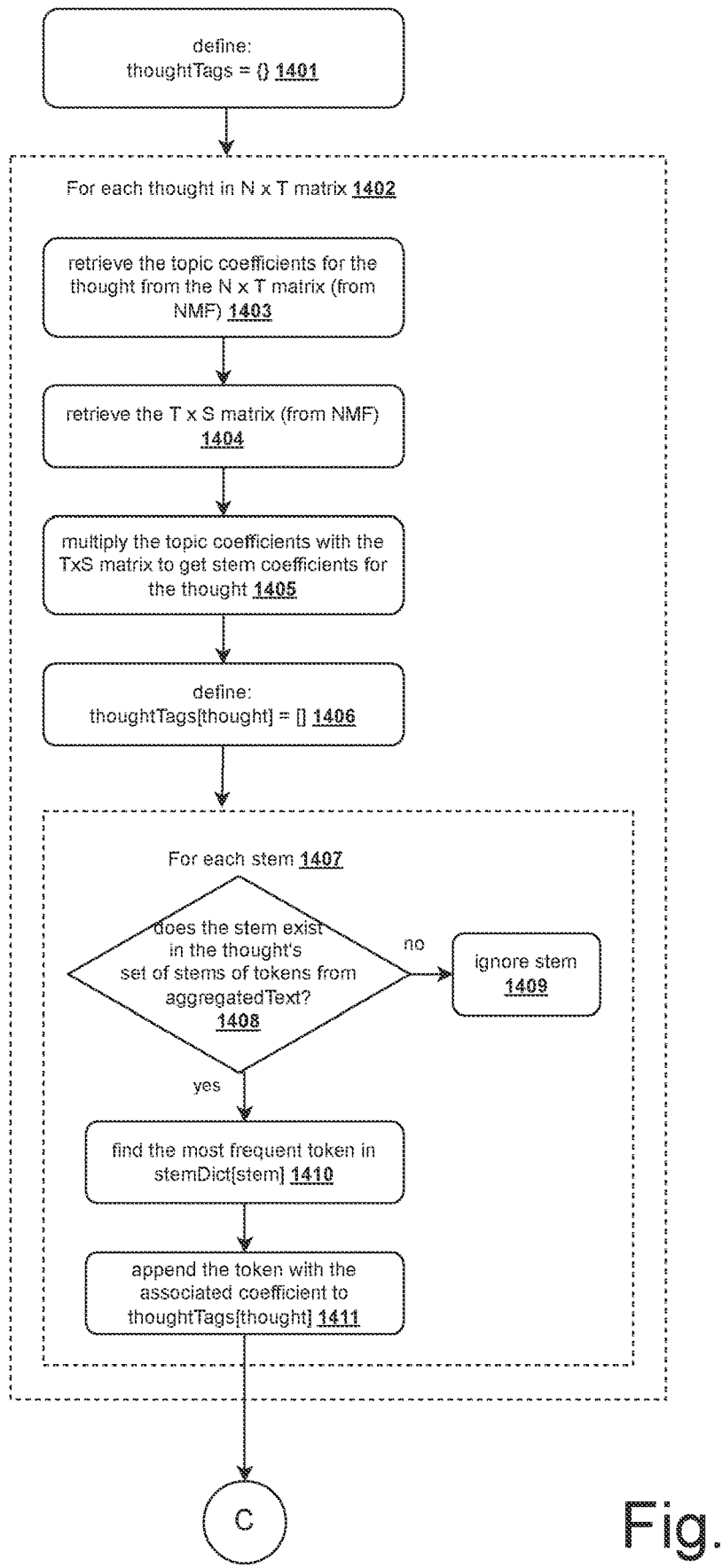
FIG. 14A-14C are flow diagrams illustrating a method for creating themes and respective theme names, according to a preferred embodiment of the invention.
Figure 14B:
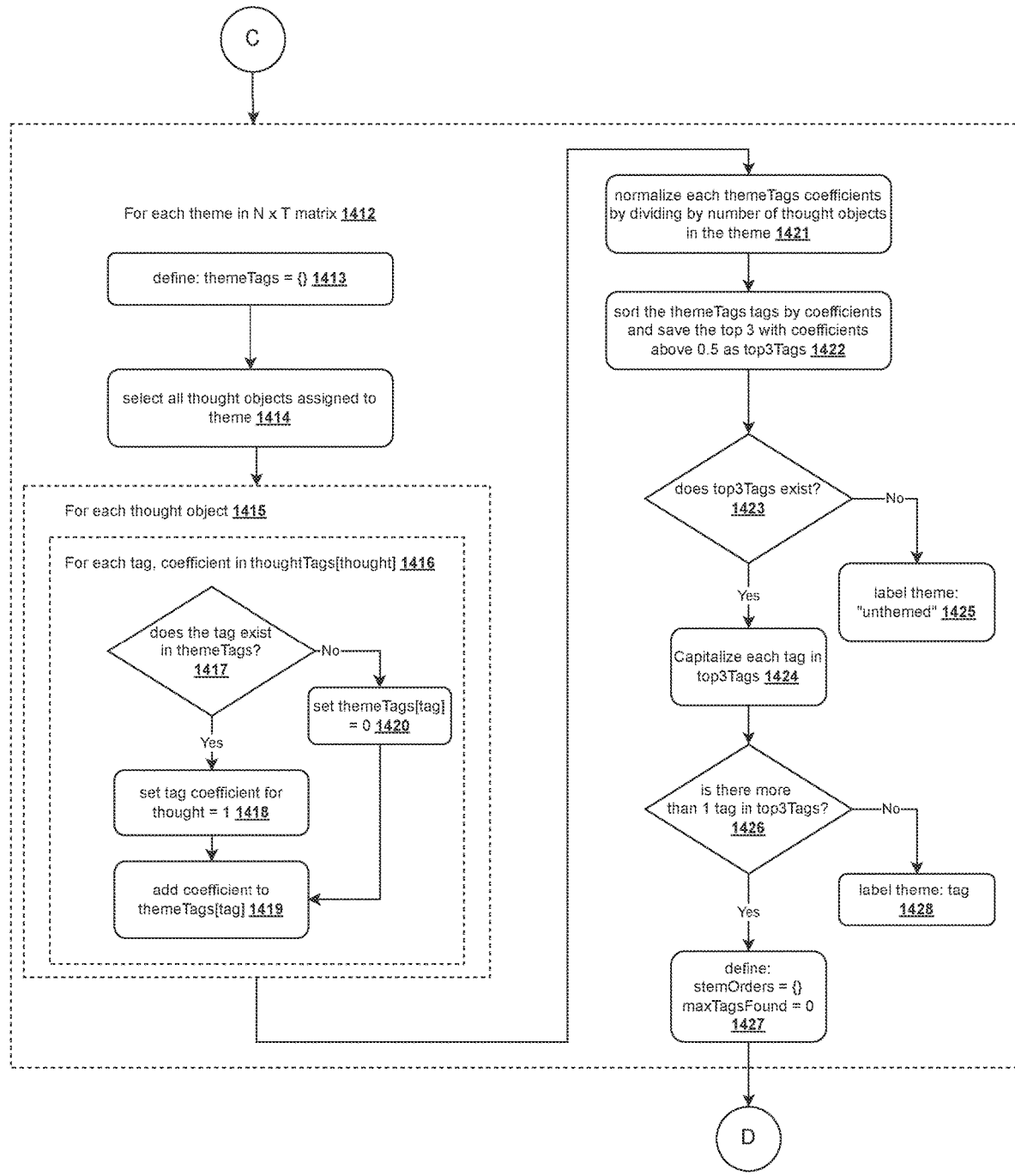
Figure 14C:
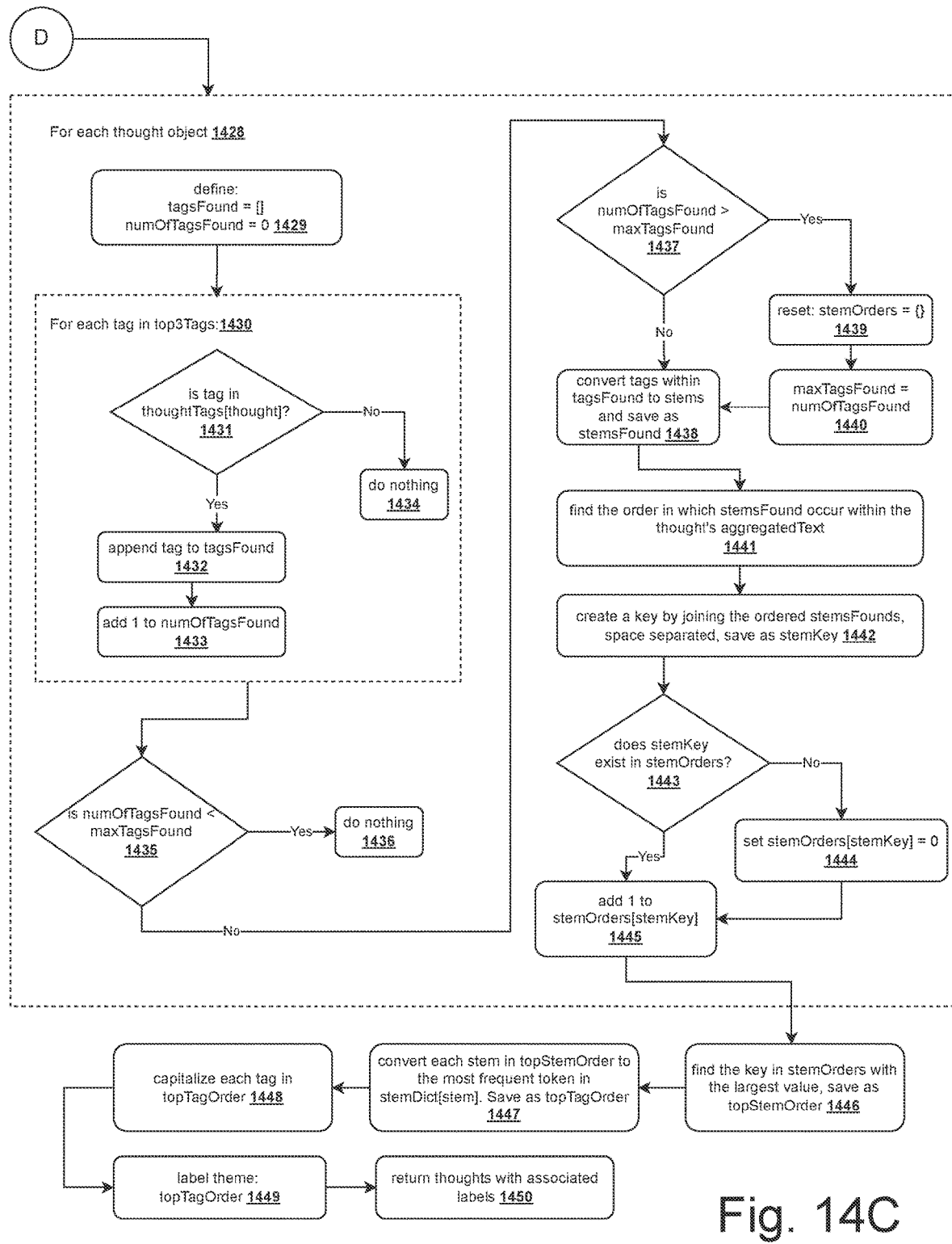

FIG. 14A-14C is a flow diagram illustrating a method for creating theme names, according to a preferred embodiment of the invention. According to the embodiment, in a first step 1401 (referring to FIG. 14A), project controller 602 may define a function for tags associated to thought objects 510, given by thoughtTags and set it initially to { }, that is, an empty dictionary. In a next step 1402, one or more components of system 600, for each thought object 510 in the N×T matrix, perform steps 1403-1411 of the method.

In step 1403, object themer 605 may retrieve topic coefficients for a thought object 510 from the N×T matrix using the non-negative matrix factorization (NMF). Further, in a next step 1404, object themer 605 may retrieve the T×S matrix, again using the Non-negative Matrix Factorization (NMF). In a next step 1405, project controller 602 may generate stem coefficients for the thought object 510. In an embodiment, the stem coefficients may be generated by multiplying the values of topic coefficients with values from the T×S matrix.

In a next step 1406, project controller 602 may define a function given by thoughtTags[thought] and set it to [ ], that is, an initialization of an empty list for a specific thought object 510, within the loop. In a next step 1407, one or more components of system 600 may perform steps 1408-1411 of the method, for each stem.

In step 1408, project controller 602 may determine whether the stem exists in the set of stems of tokens from aggregatedText, for the thought object 510. If the stem does not exist in the set of stems, in a next step 1409, project controller 602 may disregard the stem from processing. Otherwise, in a next step 1410, project controller 602 may determine the most frequent token in the stem dictionary function given by stemDict[stem]. Further, in a next step 1411, tokenizer 603 may append the token with the associated coefficient to the function thoughtTags[thought]. The method may then continue to step 1412 of FIG. 14B.

FIG. 14B, continues processing at step 1412, for each theme in the N×T matrix, one or more components of system 600 may perform the steps 1413-1427 of the method 1400. In step 1413, project controller 602 may define a function themeTags and set it to { }. In a next step 1414, object themer 605 may select all thought objects 510 assigned to a selected theme. Starting from a next step 1415, for each thought object 510, project controller 602 may perform steps 1416-1419 of method. In step 1416, for each tag coefficient in thoughtTags[thought], project controller 602 may perform steps 1417-1420 of method. In step 1417, project controller 602 may determine whether the tag exists in themeTags? If the tag exists, project controller 602 may set the tag coefficient for associated thought object 510 as 1. In a next step 1419, project controller 602 may then add the tag coefficient to themeTags[tag]. Otherwise, if the tag does not exist in the themeTags, in a next step 1420, project controller may set themeTags[tag]=0.

In a next step 1421, object themer 605 may normalize each coefficient saved in themeTags by dividing by the number of thought objects 510 in that theme. Further, in a next step 1422, object themer 605 may sort the themeTags tags by values of the coefficients and save the top 3 coefficients having a value greater than, for example, 0.5, as top3Tags.

In a next step 1423, project controller 602 may determine whether at least one of top3Tags exists in the themeTags. If the top3Tags exist, in a next step 1424, project controller 602 may capitalize each tag in top3Tags. Otherwise, in a next step 1425, project controller may label the theme as "unthemed." Further, in a next step 1426, project controller 602 may further determine if there are more than one tags saved as the top3Tags. If there are more than one tags, in a next step 1427, project controller 602 may define a function stemOrders and set it to { }. Further, project controller may also define a function maxTagsFound and set it to, for example, 0. Otherwise, in a next step 1428, project controller 602 may label theme using a single tag variable present in top3Tags. The method may then continue to FIG. 14C.

Referring to FIG. 14C, in step 1428, for each thought object 510, one or more components of system 600 may perform the steps 1429-1445 of the method.

In step 1429, project controller 602 may define function tagsFound and set it to [ ]; and a function numOfTagsFound and set it to, for example, 0. In step 1430, for each tag in top3Tags, project controller 602 may perform steps 1431-1433 of the method. In step 1431, project controller 602 may determine whether each tag the top3Tags is present in thoughtTags[thought]. If it is determined, by project controller 602, that each tag is present in thoughtTags[thought], in a next step 1432, project controller 602 may append tag to tagsFound. In a next step 1433, project controller 602 may add, for example, 1 to numOfTagsFound. Otherwise, if each tag is not present in thoughtTags[thought], in a next step 1434, project controller 602 may perform no further function.

In a next step 1435, project controller 602 may determine whether a value of numOfTagsFound is less than a value of maxTagsFound. If the value of numOfTagsFound is less than a value of maxTagsFound, in a next step 1436, project controller 602 may perform no function. Otherwise, in a next step 1437, project controller 602 may determine if the value of numOfTagsFound is greater than the value of maxTagsFound. If the value of numOfTagsFound is not greater than the value of maxTagsFound, in a next step 1438, project controller 602 may convert tags within tagsFound to stems and save to a response database 607 (for example as variable, "stemsFound.") Otherwise, in a next step 1439, project controller may reset function stemOrders to { }.

Further, in a next step 1440, if the value of maxTagsFound is equal to the value of numOfTagsFound, project controller 602 may return to step 1438 (see above). In a next step 1441, project controller 602 may find an order in which stemsFound occur within the aggregatedText of the thought object 510. In a next step 1442, project controller 602 may create a key by joining the ordered stemsFounds, separated by spaces, and save the key as stemKey.

In an embodiment, in a next step 1443, project controller 602 may determine whether the stemKey exists in stemOrders function. If the stemKey exists, in a next step 1444, project controller 602 may set function stemOrders [stemKey] as, for example, 0. Otherwise, in a next step 1445, project controller may add, for example, 1 to function stemOrders[stemKey]. Further, in a next step 1446, project controller 602 may find the key in stemOrders, having the largest value, and save the key as topStemOrder.

In a next step 1447, project controller 602 may convert each stem in topStemOrder to the most frequent token in stemDict[stem]. Project controller 602 may save such stems as topTagOrder. Further, in a next step 1448, project controller 602 may capitalize each tag in topTagOrder. In a next step 1449, project controller 602 may label theme as topTagOrder. Further, in a next step 1450, project controller 602 may return thought objects 510 with their associated themes. In a preferred embodiment, thought objects with associated themes are displayed on a graphical user interface.

The skilled person will be aware of a range of possible modifications of the various embodiments described above. Accordingly, the present invention is defined by the claims and their equivalents.

What is claimed is:

1. A system for creating a themed plurality of thought objects, the system comprising:
an object theming computer comprising a processor, a memory and a plurality of programming instructions, the plurality of programming instructions when executed by the processor cause the processor to:
for each thought object of a plurality of thought objects:
create aggregated text by aggregating a plurality of text associated with a
first thought object of a plurality of thought objects;
tokenize the aggregated text into a plurality of tokens;
for each token of the plurality of tokens:
responsive to a first token, of the plurality of tokens, is not a stop word, convert the first token to an associated stem, otherwise remove the first token; and
add the associated stem to a stem dictionary;
associate a theme to each thought object of at least a portion of the plurality of thought objects, wherein the associated theme is extracted from a previously themed plurality of thought objects or the associated theme is generated from a plurality of clustered un-themed thought objects with similar topics, or both; and
display the themed plurality of thought objects on a graphical user interface of a user device.

2. The system of claim 1, wherein to extract a theme from a previously themed plurality of thought objects, the plurality of programming instructions when further executed by the processor cause the processor to:
receive one or more previously themed thought objects, the one or more previously themed thought objects each having an associated theme, of a plurality of themes;
create a first list of stems comprising a plurality of unique stems, the plurality of unique stems associated with the one or more previously themed thought objects;
create a first matrix based on a quantity of the one or more previously themed thought objects, and a quantity of stems in the first list of stems, the first matrix comprising term frequency-inverse document frequency values for each thought object, of the plurality of thought objects, and each stem, of the first list of stems;
sum the term frequency-inverse document frequency values per stem, of the first list of stems, across the thought objects associated to each theme of the plurality of themes;
normalize the term frequency-inverse document frequency values by dividing each value by a maximum term frequency-inverse document frequency value within a first theme of the plurality of themes;
select at least a portion of stems of the first list of stems, the at least portion of stems comprising stems associated with a highest term frequency-inverse document frequency value;
receive a plurality of un-themed thought objects;
create a second list of stems comprising one or more unique stems, the one or more unique stems associated with the plurality of un-themed thought objects;
create a second matrix based on a quantity of the plurality of un-themed thought objects, and a quantity of stems in the second list of stems, the second matrix comprising term frequency values for each thought object, of the plurality of thought objects, and each stem, of the second list of stems; and for each un-themed thought object, of the plurality of un-themed thought objects:
  if at least one stem of the second list of stems has a non-zero value, then:
    identify a filtered plurality of stems from the first matrix found in the second list of stems;
    sum the term frequency values associated with the filtered plurality of stems for each theme of the plurality of themes; and
    identify a theme associated with a highest sum and assign the theme to at least a portion of the plurality of un-themed thought objects.

3. The system of claim 1, wherein to generate the plurality of clustered un-themed thought objects with similar topics, the programming instructions when further executed by the processor, cause the processor to:
  receive a plurality of remaining un-themed thought objects; and
  for each remaining un-themed thought object, of the plurality of remaining un-themed thought objects, with at least one associated stem:
    create a first list of stems, the first list of stems comprising unique stems across all remaining un-themed thought objects;
    create a thought versus stem matrix based on a quantity of the plurality of remaining un-themed thought objects, and a quantity of stems in the list of stems, the matrix comprising a term frequency-inverse document frequency value for each remaining un-themed thought object and each stem, of the list of stems;
    determine a preferred number of topics;
    build a non-negative matrix factorization to create a set of topics based on the preferred number of topics such that each topic is a weighted combination of stems, and a weighted combination of the determined set of topics per un-themed thought object; and
    for each remaining un-themed thought objects:
      identify a first coefficient associated with a minimum topic coefficients;
      identify a second coefficient associated with a maximum topic coefficient;
      for each topic coefficient associated to a first thought object of the plurality of remaining un-themed thought objects:
        subtract the topic coefficient by the first coefficient and divide by the a difference of the second coefficient and the first coefficient;
      determine a preferred number of themes;
      apply K-means clustering on the matrix using the preferred number of themes;
      create one or more thought tags;
      calculate one or more themes; and
      associate each thought object of the plurality of remaining un-themed thought objects with a theme of the one or more themes.

4. The system of claim 3, wherein to calculate the preferred number of themes, the plurality of programming instructions when further executed by the processor cause the processor to apply k-means clustering and an elbow plot, comprising an application of coefficients of each topic per thought object for a range of themes related to a number of un-themed thought objects.

5. The system of claim 3, wherein to calculate the one or more thought tags, the plurality of programming instructions when further executed by the processor cause the processor to:
  define a first function for tags associated with an un-themed thought object and set the first function to an empty dictionary;
  retrieve topic coefficients for the un-themed thought object from a thought versus topic matrix, using non-negative matrix factorization (NMF);
  generate stem coefficients for the un-themed thought object by multiplying values of topic coefficients associated with the un-themed thought object, with values from the thought versus stem matrix;
  define a second function and set the second function to an empty list for the un-themed thought object; and
  responsive to a stem existing in a set of stems of tokens associated with the un-themed thought object, generate a most frequent token in the stem dictionary function and append the most frequent token with the associated coefficient to the second function.

6. The system of claim 5 wherein to calculate the one or more themes, the plurality of programming instructions when further executed by the processor cause the processor to:
  define a third function set to an empty dictionary;
  select a thought object assigned to a selected theme;
  for each tag coefficient in the second function, determine whether the tag coefficient exists in a list of theme tags;
  if the tag coefficient exists in the list of theme tags, set the tag coefficient for the thought object to a first predefined value;
  otherwise, set the tag coefficient to a second predefined value;
  normalize each tag coefficient saved in the list of theme tags;
  sort the list of theme tags by values of their respective tag coefficients;
  generate a ranked list of theme tags based on the sorting;
  responsive to at least one of the ranked list of theme tags occurring in the list of theme tags, capitalize each such theme tag; and
  responsive to none of the theme tags from the ranked list of theme tags occurring in the list of theme tags, label the associated theme as un-themed.

7. The system of claim 6, wherein the plurality of programming instructions when further executed by the processor cause the processor to:
  responsive to the ranked list of theme tags comprising more than one theme tag, define a fourth function set to an empty dictionary; and
  responsive to the ranked list of theme tags containing a single theme tag, label the associated theme using the single theme tag.

8. A computer-implemented method for creating a themed plurality of thought objects, the method comprising:
  for each thought object of a plurality of thought objects:
    creating, by an object theming computer, aggregated text by aggregating a plurality of text associated with a first thought object of a plurality of thought objects;
    tokenizing, by the object theming computer, the aggregated text into a plurality of tokens;
    for each token of the plurality of tokens:
      responsive to a first token of the plurality of tokens is not a stop word, converting, by the object theming computer, each token of the plurality of tokens to an associated stem, otherwise remove the first token; and adding, by the object theming computer, the associated stem to a stem dictionary;

associating, by the object theming computer, a theme to each thought object of at least a portion of thought objects of the plurality of thought objects wherein the associated theme is extracted from a previously themed plurality of thought objects or the associated theme is generated from a plurality of clustered un-themed thought objects with similar topics, or both; and display the themed plurality of thought objects on a graphical user interface of a user device.

9. The method of claim 8, wherein extracting a theme from a previously themed plurality of thought objects comprises the steps of:

receiving, by the object theming computer, one or more previously themed thought objects, the one or more previously themed thought objects each having an associated theme, of a plurality of themes;

creating, by the object theming computer, a first list of stems comprising a plurality of unique stems, the plurality of unique stems associated with the one or more previously themed thought objects;

creating, by the object theming computer, a first matrix based on a quantity of the one or more previously themed thought objects, and a quantity of stems in the first list of stems, the first matrix comprising term frequency-inverse document frequency values for each thought object, of the plurality of thought objects, and each stem, of the first list of stems;

summing, by the object theming computer, the term frequency-inverse document frequency values per stem, in the first list of stems, across the thought objects associated to each theme of the plurality of themes;

normalizing, by the object theming computer, the term frequency-inverse document frequency values by dividing each value by a maximum term frequency-inverse document frequency value within a first theme of the plurality of themes;

selecting, by the object theming computer, at least a portion of stems of the first list of stems, the at least portion of stems comprising stems associated with a highest term frequency-inverse document frequency values;

receiving, by the object theming computer, a plurality of un-themed thought objects;

creating, by the object theming computer, a second list of stems comprising one or more unique stems, the one or more unique stems associated with the plurality of un-themed thought objects;

creating, by the object theming computer, a second matrix based on a quantity of the plurality of un-themed thought objects, and a quantity of stems in the second list of stems, the second matrix comprising term frequency values for each thought object, of the plurality of thought objects, and each stem, of the second list of stems; and for each un-themed thought objects, of the plurality of un-themed thought objects:

if at least one stem of the second list of stems has a non-zero value, then:

identifying, by the object theming computer, a filtered plurality of stems from the first matrix found in the second list of stems;

summing, by the object theming computer, the term frequency values associated with the filtered plurality of stems for each theme of the plurality of themes; and identifying, by the object theming computer, a theme associated with a highest sum and assigning the theme to at least a portion of the plurality of un-themed thought objects.

10. The method of claim 8, wherein generating the plurality of clustered un-themed thought objects with similar topics comprises the steps of:

receiving, by the object theming computer, a plurality of remaining un-themed thought objects; and for each remaining un-themed thought object, of the plurality of remaining un-themed thought objects, with at least one associated stem:

creating, by the object theming computer, a first list of stems, the first list of stems comprising unique stems across all remaining un-themed thought objects;

creating, by the object theming computer, a thought versus stem matrix based on a quantity of the plurality of remaining un-themed thought objects, and a quantity of stems in the list of stems, the matrix comprising a term frequency-inverse document frequency value for each remaining un-themed thought object and each stem, of the list of stems;

determining, by the object theming computer, a preferred number of topics;

building, by the object theming computer, a non-negative matrix factorization to create a set of topics based on the preferred number of topics such that each topic is a weighted combination of stems, and a weighted combination of the determined set of topics per un-themed thought object; and for each remaining un-themed thought object:

identifying, by the object theming computer, a first coefficient associated with a minimum topic coefficients;

identifying, by the object theming computer, a second coefficient associated with a maximum topic coefficient;

for each topic coefficient associated to a first thought object of the plurality of remaining un-themed thought objects:

subtracting, by the object theming computer, the topic coefficient by the first coefficient and divide by a difference of the second coefficient and the first coefficient;

determining, by the object theming computer, a preferred number of themes;

applying, by the object theming computer, K-means clustering on the matrix using the preferred number of themes;

creating, by the object theming computer, one or more thought tags;

calculating, by the object theming computer, one or more themes; and associating, by the object theming computer, each thought object of the plurality of remaining un-themed thought objects with a theme of the one or more themes.

11. The method of claim 10, wherein to calculate the preferred number of themes, the method further comprises the step of applying, by the object theming computer, k-means clustering and an elbow plot, comprising an application of coefficients of each topic per thought object for a range of themes related to a number of un-themed thought objects.

12. The method of claim 10, wherein to calculate the one or more thought tags, the method further comprises:
    defining, by the object theming computer, a first function for tags associated with an un-themed thought object and set the first function to an empty dictionary;
    retrieving, by the object theming computer, topic coefficients for the un-themed thought object from a thought versus topic matrix, using non-negative matrix factorization (NMF);
    generating, by the object theming computer, stem coefficients for the un-themed thought object by multiplying values of topic coefficients associated with the un-themed thought object, with values from the thought versus stem matrix;
    defining, by the object theming computer, a second function and set the second function to an empty list for the un-themed thought object;
    calculate one or more tag coefficients associated with the second function; and
    responsive to the stem existing in a set of stems of tokens associated with the un-themed thought object, generating, by the object theming computer, a most frequent token in the stem dictionary function and appending the most frequent token with the associated coefficient to the second function.

13. The method of claim 12, wherein calculating the one or more theme comprises the steps of:
    defining, by the object theming computer, a third function set to an empty dictionary;
    selecting, by the object theming computer, a thought object assigned to a selected theme;
    for each tag in the second function, determining, by the object theming computer, whether the tag exists in a list of theme tags;
    if the tag exists in the list of theme tags, setting, by the object theming computer, the tag for the thought object to a first predefined value;
    otherwise, setting, by the object theming computer, the tag coefficient to a second predefined value;
    normalizing, by the object theming computer, each tag coefficient saved in the list of theme tags;
    sorting, by the object theming computer, the list of theme tags by values of their respective tag coefficients;
    generating, by the object theming computer, a ranked list of theme tags based on the sorting;
    responsive to at least one of the ranked list of theme tags occurring in the list of theme tags, capitalizing, by the object theming computer, each such theme tag; and
    responsive to none of the theme tags from the ranked list of theme tags occurring in the list of theme tags, labelling, by the object theming computer, the associated theme as un-themed.

14. The method of claim 13, wherein the method further comprises:
    Responsive to the ranked list of theme tags comprising more than one theme tag, defining, by the object theming computer, a fourth function set to an empty dictionary; and
    responsive to the ranked list of theme tags comprising a single theme tag, labelling, by the object theming computer, the associated theme using the single theme tag.

* * * * *